(12) United States Patent
Fulcher et al.

(10) Patent No.: US 6,929,179 B2
(45) Date of Patent: Aug. 16, 2005

(54) AUTOMATED FEE COLLECTION AND PARKING TICKET DISPENSING MACHINE

(75) Inventors: Robert A. Fulcher, Grand Junction, CO (US); Allan E. Beavers, Grand Junction, CO (US); David H. Bailinson, Grand Junction, CO (US)

(73) Assignee: Miti Manufacturing Company, Grand Junction, CO (US)

( * ) Notice: Subject to any disclaimer, the term of this patent is extended or adjusted under 35 U.S.C. 154(b) by 0 days.

(21) Appl. No.: 10/818,742

(22) Filed: Apr. 5, 2004

(65) Prior Publication Data

US 2004/0226993 A1 Nov. 18, 2004

Related U.S. Application Data

(63) Continuation of application No. 10/341,916, filed on Jan. 13, 2003, now Pat. No. 6,715,673, which is a continuation of application No. 09/458,577, filed on Dec. 9, 1999, now Pat. No. 6,505,774.
(60) Provisional application No. 60/111,526, filed on Dec. 9, 1998.

(51) Int. Cl.[7] ................................................ G06F 7/08
(52) U.S. Cl. ...................................... 235/381; 235/384
(58) Field of Search ................................ 235/381, 384, 235/379, 441, 493, 380; 194/213; 705/43, 44

(56) References Cited

U.S. PATENT DOCUMENTS

| | | | |
|---|---|---|---|
| 3,775,593 A | 11/1973 | Gieringer et al. | 235/61.8 |
| 3,828,904 A | 8/1974 | Naitou et al. | 194/10 |
| 4,441,018 A | * 4/1984 | Wessel | 235/458 |
| 4,463,844 A | * 8/1984 | Huffman et al. | 194/213 |
| 4,786,787 A | 11/1988 | Nawada et al. | 235/381 |
| 4,858,743 A | 8/1989 | Paraskevakos et al. | 194/205 |
| 4,861,049 A | 8/1989 | Losi | 180/275 |
| 4,900,174 A | 2/1990 | Didiergeorge | 400/621 |

(Continued)

FOREIGN PATENT DOCUMENTS

| | | |
|---|---|---|
| EP | 275210 | 7/1988 |
| GB | 2158628 | 11/1985 |
| GB | 2202068 | 9/1988 |
| GB | 2208188 | 8/1989 |
| JP | 57-201955 | 12/1982 |
| JP | 3257597 | 11/1991 |
| JP | 11328222 | 11/1999 |

OTHER PUBLICATIONS

PVM by Digital Pioneer, Digital Pioneer and Intella Series, Copyright 1996.
"Pay–On–Foot Revenue Control," *The Parking Consultant*, vol. 1, Issue II (1993).

Primary Examiner—Thien M. Le
(74) Attorney, Agent, or Firm—Sheridan Ross P.C.

(57) ABSTRACT

An automated fee collection and ticket dispensing machine is disclosed that is capable of operating under a variety of operating modes. The machine permits users to purchase a variety of passes. The disclosed machine includes printers to produce receipts or passes for services or activities. Payment may be made using credit cards, debit cards or cash. The device is provided with networking means, to allow central control and monitoring of the device. Power for the machine may be provided by hard-wiring the device to conventional AC power lines, by solar panels, by batteries, or a combination of any of these. The user interface includes a video output screen with "touch screen" capability to receive user input, audio output means, and a proximity sensor to activate the machine when a user approaches. Additionally, security means are provided to deter potential thieves or vandals.

21 Claims, 23 Drawing Sheets

U.S. PATENT DOCUMENTS

| | | | |
|---|---|---|---|
| 4,945,213 A | 7/1990 | Didiergeorge | 235/31 |
| 4,970,655 A | 11/1990 | Winn et al. | 235/381 |
| 4,984,170 A | 1/1991 | Hirahara | 235/384 |
| 5,016,745 A | 5/1991 | Schoeb et al. | 194/346 |
| 5,050,207 A | 9/1991 | Hitchcock | 379/93.19 |
| 5,055,657 A | 10/1991 | Miller et al. | 235/381 |
| 5,065,156 A | 11/1991 | Bernier | 340/932.2 |
| 5,131,516 A | 7/1992 | Clough | 194/205 |
| 5,192,855 A | 3/1993 | Insulander et al. | 235/381 |
| 5,210,603 A | 5/1993 | Sabin | 348/157 |
| 5,398,932 A | 3/1995 | Eberhardt et al. | 463/17 |
| 5,408,417 A | 4/1995 | Wilder | 235/381 |
| 5,410,295 A | 4/1995 | Van Lint | 340/309.15 |
| 5,429,222 A | 7/1995 | Delay | 194/343 |
| 5,434,399 A | 7/1995 | Barbe | 235/382 |
| 5,472,116 A | 12/1995 | Barbe et al. | 221/126 |
| 5,492,212 A | 2/1996 | Fillod et al. | 194/202 |
| 5,500,517 A | 3/1996 | Cagliostro | 235/486 |
| 5,726,430 A | 3/1998 | Ruggirello | 235/379 |
| 5,732,812 A | 3/1998 | Grainger et al. | 194/217 |
| 5,768,142 A | 6/1998 | Jacobs | 364/479.01 |
| 5,770,845 A | 6/1998 | Hjelmvik | 235/382 |
| 5,777,951 A | 7/1998 | Mitschele et al. | 368/90 |
| 5,913,454 A * | 6/1999 | McHale | 222/2 |
| 5,966,696 A | 10/1999 | Giraud | 705/14 |
| 6,023,688 A | 2/2000 | Ramachandran et al. | 705/44 |
| 6,026,367 A | 2/2000 | Hjelmvik | 705/13 |
| 6,078,272 A | 6/2000 | Jacobs et al. | 340/932.2 |
| 6,081,205 A | 6/2000 | Williams | 340/932.2 |
| 6,211,930 B1 | 4/2001 | Sautter et al. | 349/66 |
| 6,228,657 B1 | 5/2001 | Genovese et al. | 422/61 |
| 6,246,338 B1 | 6/2001 | Hjelmvik | 340/932.2 |
| 6,505,774 B1 | 1/2003 | Fulcher et al. | 235/381 |
| 6,715,673 B2 | 4/2004 | Fulcher et al. | 235/381 |
| 6,766,943 B2 * | 7/2004 | Magee et al. | 235/379 |
| 6,793,133 B2 * | 9/2004 | Magee et al. | 235/379 |
| 2004/0099726 A1 * | 5/2004 | Magee et al. | 235/379 |
| 2004/0099727 A1 * | 5/2004 | Magee et al. | 235/379 |
| 2004/0149819 A1 * | 8/2004 | Shepley et al. | 235/379 |
| 2004/0153409 A1 * | 8/2004 | Shepley et al. | 705/43 |
| 2004/0178259 A1 * | 9/2004 | Scarafile et al. | 235/379 |
| 2004/0178260 A1 * | 9/2004 | Scarafile et al. | 235/379 |
| 2004/0226993 A1 * | 11/2004 | Fulcher et al. | 235/381 |
| 2005/0029341 A1 * | 2/2005 | Magee et al. | 235/379 |

* cited by examiner

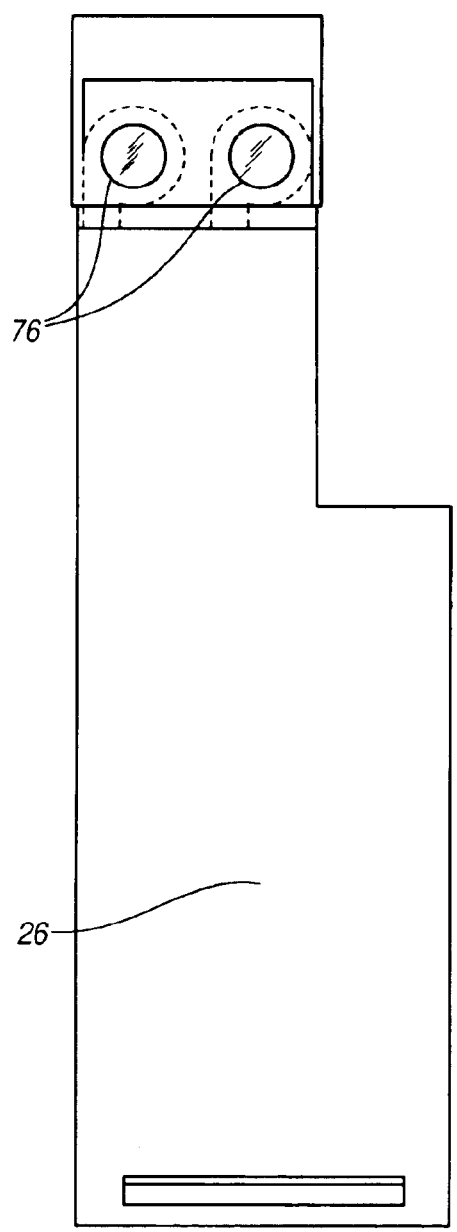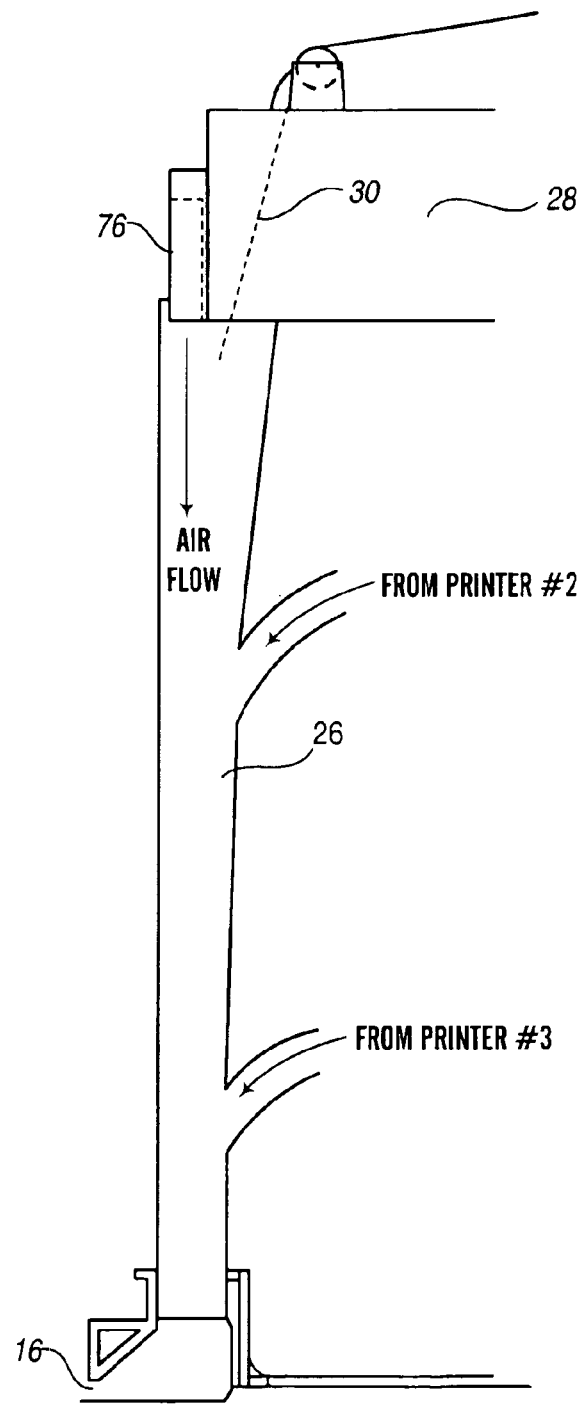
FIG. 5
FIG. 6

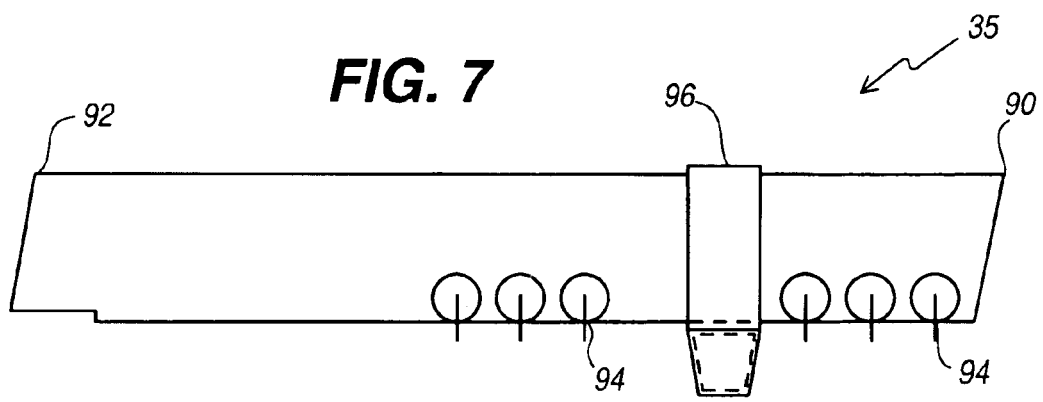
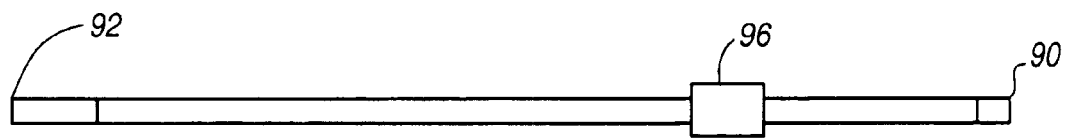

PAY AND DISPLAY

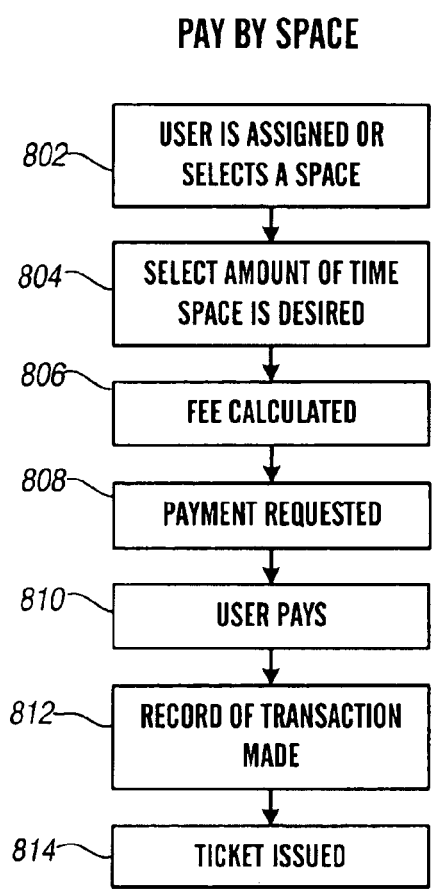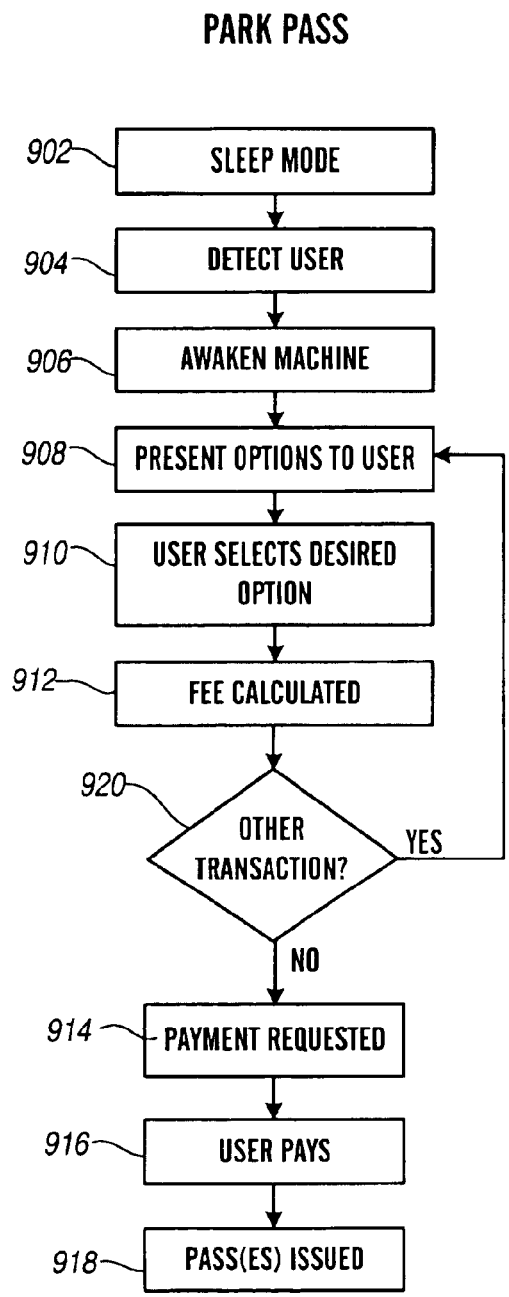

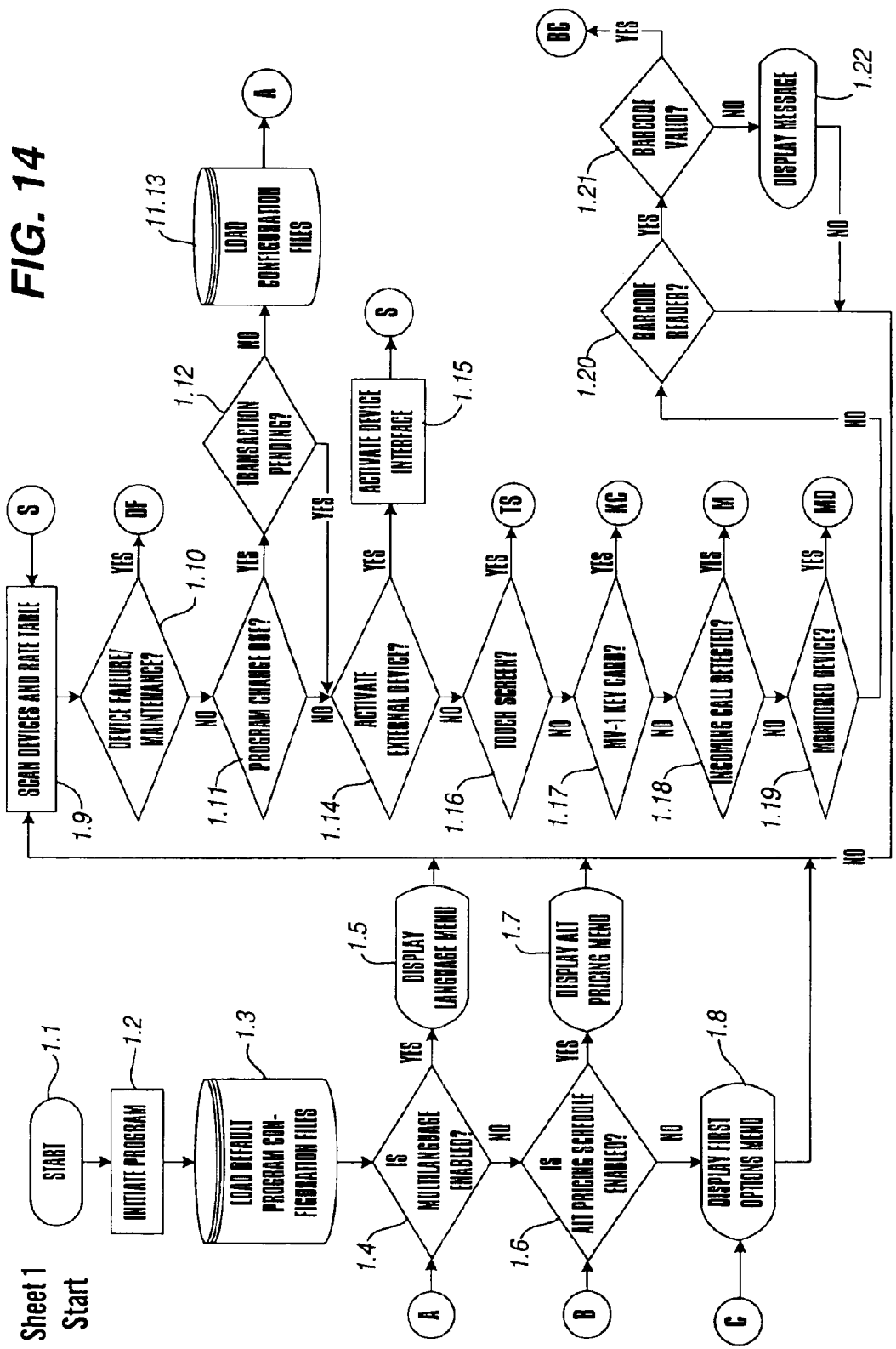

Sheet 6
Key Card Level 1

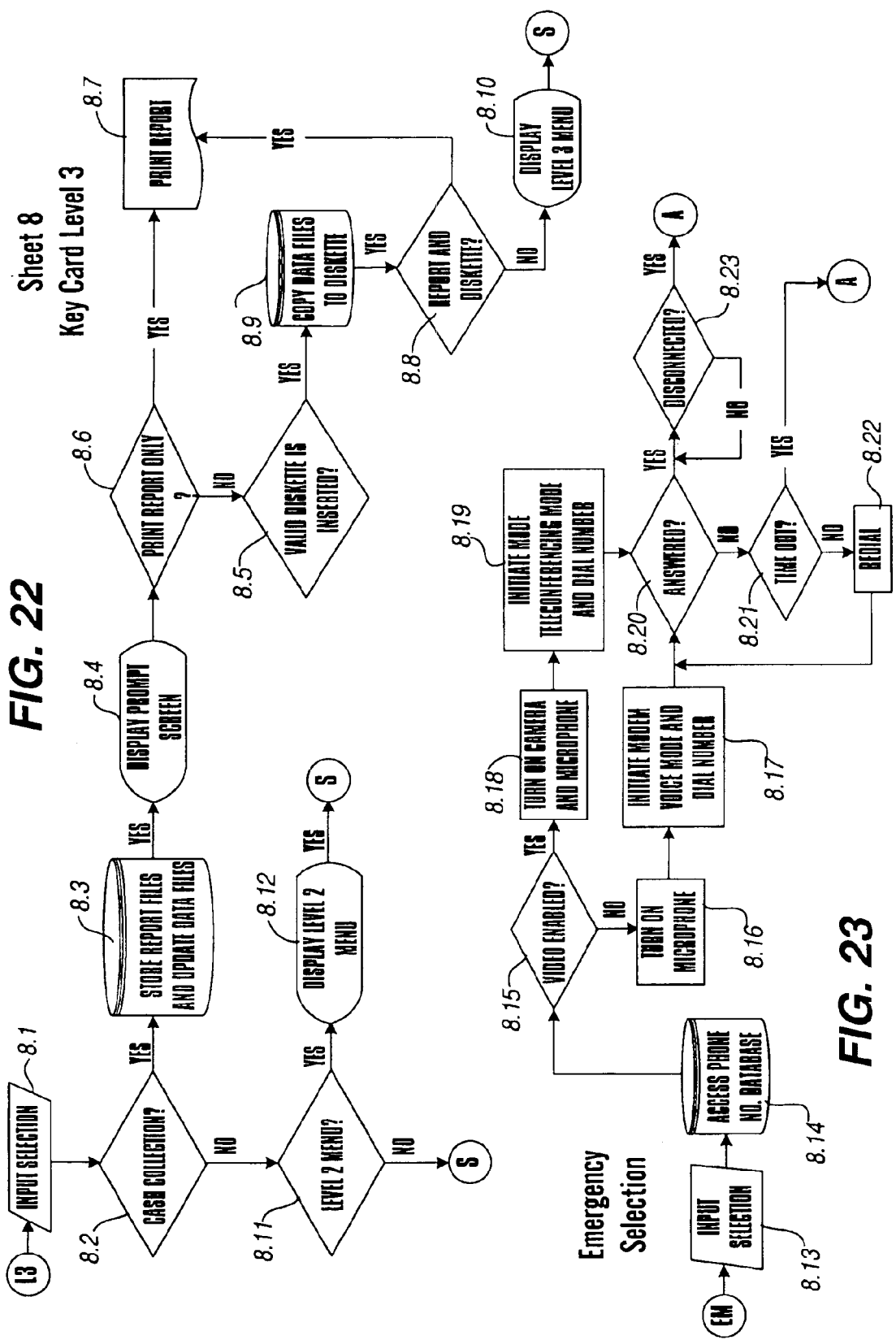

Sheet 11
Remote Menu

AUTOMATED FEE COLLECTION AND PARKING TICKET DISPENSING MACHINE

This application is a Continuation of U.S. patent application Ser. No. 10/341,916, filed Jan. 13, 2003, now U.S. Pat. No. 6,715,673, which is a Continuation of U.S. patent application Ser. No. 09/458,577, filed Dec. 9, 1999, now U.S. Pat. No. 6,505,774, which claims the benefit of U.S. Provisional Patent Application Ser. No. 60/111,526, filed on Dec. 9, 1998, all applications being incorporated herein in their entirety by reference.

FIELD OF THE INVENTION

The present invention relates to automated fee collection machines, and in particular, parking meter fee collection machines that provide printed output in the form of decals, receipts, stickers, or other tangible media as evidence that fees for parking or other activities have been paid or credited.

BACKGROUND OF THE INVENTION

In the parking and permit fee collection industry, a number of methods have been devised for collecting fees and for providing payees with proof of having paid the required fee. Some systems depend on the integrity of the patron, such as those in which the patron is given an envelope to place the fee in and a tear-off stub to serve as a receipt. However, this system offers no immediate method for verifying that the fee has actually been paid. Thus, a dishonest person can take the receipt without having paid the required fee. The risk that such a person's failure to pay the fee will be detected is low. Despite these shortcomings, such "honor-based" collection systems are in wide use because they are inexpensive to install and because they require no power source, which may be difficult to provide in remote locations.

The collection of fees for fee-based activities using unattended collection stations has long been practiced. In particular, in connection with the collection of fees at an automobile parking lot, armored boxes having slots through which fees may be deposited have long been used. In many instances, the individual parking spots in a parking lot are numbered, and a corresponding numbered slot in the armored box is provided. In use, a user parks his or her car in a numbered slot, and deposits the appropriate fee in the slot corresponding to the chosen parking spot. The user fee is then held in an individual box within the larger armored box corresponding to the numbered slot. Enforcement of the prescribed charges requires parking lot personnel to travel to the fee collection box, remove a padlock securing the cover of the armored fee collection box, and to manually ensure that the proper amount has been paid for each of the occupied parking spots. Although the system employs mechanical components that are simple in design and relatively inexpensive, they suffer from a number of disadvantages.

Among the disadvantages of such slot-type fee collection boxes is the ease with which fraud can be perpetrated against the parking lot owner. For instance, an accurate accounting of a day's receipts relies entirely on the attentiveness and honesty of the person collecting the fees. Therefore, there is little incentive for an attendant to forgo stealing all or a portion of the collected fees. In addition, it is relatively easy for a user to pay less than the prescribed amount without penalty. For example, a user may submit payment for one hour of parking, yet use the parking space for more than one hour. Such underpayment is difficult to police without frequent checks by parking lot personnel of the fees collected and the cars parked in the lot. Another example of underpayment is where a patron, having paid for a full day's parking fee, leaves earlier in the day, and that person's place is then taken by another, who does not pay. In this instance, the lot foregoes fees that could have been collected had use of the individual parking spots been accurately tracked.

An additional disadvantage of such fee collection boxes is that they require a user to have exact change. Also, they provide the user with no receipt to prove proper payment, and no reminder of when the time paid for has expired.

With respect to user fees collected by state and national parks, an honor system has typically been used. Generally, an armored box having a slot for insertion of the proper fee is provided. A user who, for example, wishes to pay for a camping spot must typically enter the number of the camping spot on a provided envelope, place the proper payment in that envelope, and slide the envelope through the slot of the armored box. Although a tear-off receipt is often provided, there is no independent verification that the proper fee has been paid. Also, such a system offers no way for a user to know whether any camping spots remain, without actually traveling to the desired spot and making a determination as to whether the spot is occupied. Furthermore, because such unattended fee collection boxes are often located in remote areas, it is often difficult to send park rangers or other personnel to collect paid fees and to ensure that users have made proper payment.

More sophisticated fee collection systems include electronic means to detect whether a specified amount of money has been provided to a collection box. These systems may then provide the patron with a receipt. However, such systems typically require that the patron take the printed receipt to, for example, a park ranger, before receiving the required decal or other method of proving that the required fees have been paid. Also, such devices lack flexibility in the types of permits and fees charged by any one such machine. These machines also lack the ability to be integrated within a larger network. Furthermore, such devices typically require a large amount of power, making installation in remote locations difficult.

In the context of fee collection devices for use in parking lots, automated systems may allow a user to purchase the use of a spot and issue the user a printed receipt indicating the time paid for and serving as proof that the fee has in fact been paid. Other devices may issue a printed ticket at an entry gate, and encode information regarding the date and time of entry on a magnetic stripe. Upon returning to the parking lot to remove his or her car, a user may pay the incurred fee at an automated device. This device may determine the proper fee by reading the magnetic stripe on the issued card to determine the amount of time the parking spot has been in use. The parking machine may then encode the stripe on the issued ticket as being paid, and allow a prescribed amount of time for the user to exit the lot. The user exits the lot by presenting the validated ticket to a card reader associated with the exit gate. The ticket is then collected by the exit gate, and the user is allowed to leave the lot.

However, these automated machines suffer from a number of disadvantages. For example, it is difficult to re-program such machines to perform different or additional functions. This is because conventional automated fee collection devices have employed microcontrollers having a single operating program hard coded in associated EPROM, EEPROM or ROM. Accordingly, re-programming such devices generally requires that the entire program be erased and a new program encoded in memory (e.g. in the case of EPROM and EEPROM), or replacement of the entire chip (e.g., where the microcontroller has ROM). Regardless of the type of memory, the re-programming of a microcontroller requires that the fee collection device be shut down. Also as a result of the use of microcontrollers, the number of functions that such devices can perform is severely limited. Therefore, such devices have generally been provided with only one operational mode.

Additionally, conventional automated fee collection devices are difficult to service. In particular, the opening of such devices to service the interior removes the devices from service, as essential componentry on the cover is then disassociated with internal components. Further, even during servicing that does not require removal of the machine face plate, other servicing operations may require the machine to be removed from service. For instance, any changes made to the operating program of the machine generally requires that the existing program be entirely erased from memory, wherein a new program containing the changes is loaded in its place. Because the entire program must be erased and then replaced, the machine is unable to function during such operations. Existing automated fee collection devices also are vulnerable to vandalism and theft.

For the above stated reasons, it would be advantageous to provide a method and apparatus for the automated collection of fees and dispensing of tickets. In particular, it would be advantageous to provide a method and apparatus for automatically collecting fees and making a record of payment that can be easily modified to perform different or additional functions. In addition, it would be advantageous to provide such a method and device that is economical to operate and reliable.

SUMMARY OF THE INVENTION

The present invention discloses an apparatus for collecting fees and dispersing permits, which avoids or alleviates the problems discussed above. The present invention allows an unlimited number of fee amounts and permit types to be collected and dispersed from one machine. The device has low power requirements, and includes features to protect the internal components from the effects of weather and from attempts at theft.

According to one aspect of the present invention, an automated system for collecting fees and distributing permits and receipts is provided. The device includes at least one printer used to create receipts and permits. The provided printers may incorporate thermal resin transfer technology to provide permits and decals that do not discolor over time, thus allowing their use as annual passes, or in other applications where longevity is important. The included printer or printers may also provide a bar code on the printed receipt or pass, enabling the device to allow the return of previously issued passes.

The present invention also provides an apparatus that is capable of completing multiple transactions during one use session. Therefore, a user may, for example, purchase both a camping and a boating permit during one session. These permits may then be charged to the same credit card. Additionally, transactions may be paid for in cash or coin.

It is another object of the present design that the device may be fully functional even while being serviced by a technician or attendant. Thus, patrons can deposit coins, bills, or use a credit card even while the access door is opened. This is made possible by having the ticket/change dispensing chute being interconnected to the bottom of the protective housing, as opposed to the access door. This configuration allows the various ticket dispensing chutes, coin and bill change chutes to be fully functional with the access door open.

It is yet another aspect of the invention that the coin acceptor chute be substantially tamper proof, and that the ticket/receipt chute be constructed in a manner which prevents the tickets and receipt from being stuck in the metallic chute, even during periods of low humidity when there is significant static electricity. Thus, the coin acceptor chute has been designed with a "bayonet" design which can be easily cleaned and which has drainage apertures to allow the drainage of contaminates prior to entering the coin hopper. Additionally, the ticket/receipt chute is preferably equipped with an air blower which pushes the tickets, receipts and decals downward to the dispensing tray.

A device constructed in accordance with an embodiment of the present invention further includes a radar proximity sensor to sense the presence of a user and bring the device from a "sleep" mode to an operating mode. This improves the user-friendliness of the device and allows the device to consume relatively little power. Therefore, the device is easy to use and may be placed in remote locations where access to dedicated power lines is unavailable. To further enhance the user-friendliness of the device, an embodiment constructed in accordance with the present invention includes a touch-sensitive video screen, allowing users to select items from a graphical interface. This interface is highly customizable, and may be used to provide text and graphic images, as well as receive input from the user.

In another aspect of the present invention, the machine includes a computer for controlling the machine. Preferably, a plurality of operating modes are provided, allowing the machine to be used in a variety of settings, without requiring costly modifications to the machine itself. The provided operating modes may include "pay on foot", "pay and display", "pay by space", "parks pass", "theater" or other modes. These operating modes are stored in easily modified or replaced computer files. For instance, files can be modified or replaced by loading modified or new files onto the computer's hard disk drive from a floppy disk or other drive using removable media, or by using a communications link with another computer.

In a further important aspect of this device, a bar code reader or scanner is included for use by patrons. Thus, a patron who purchases a particular camping spot and wishes to later change spots, may do so by presenting the receipt generated during the earlier transaction to the device. The scanner of the device may then read the earlier transaction from the receipt, and allow the patron to change camping spots without losing credit for the nights paid for but not spent at the first selected camping spot. Should the second selected camping spot be offered at a different cost from the first, additional payment may be required from the patron at that time, or a refund issued. Further, the system may issue reservation receipts to allow patrons to pay in advance for various permits or fees. Of course, changes made by the patron after the initial selection may be logged by the device and such information made available to the operating entity.

In a further aspect of the device, receipts, decals, and stickers may be custom printed by the device for each patron. Thus, the device need only store blank receipts, stickers, decals, or vouchers. Specific information, such as the camping spot reserved and the number of nights paid for, may be tailored to the particular transaction. Passes allowing access to particular areas may be reverse printed on clear printing stock for placement inside the windows of patrons' vehicles. Of course, pre-printed decals, tickets or vouchers may be stored in the machine for dispensing to individual patrons either as is or with additional information, such as a serial or transaction number, printed thereon when the decal, ticket or voucher is issued. As mentioned above, receipts may be generated to allow the patrons a means for proving payment and for changing initial selections made by providing a bar code to that particular patron that is subsequently read by the machine's scanner.

In a further aspect of the invention, security features are provided to issue warnings to persons attempting to steal from or vandalize the machine. These warnings may be verbal, and may become progressively more stem if tampering persists. Attempts at tampering with the machine may also activate a provided camera to capture a visual image of the perpetrator. A connection to emergency or other personnel can be established over a provided communications link, allowing the machine or a user to communicate with offsite personnel in the event of an emergency.

Thus, it is one aspect of the present invention to provide a method and apparatus for the automated collection of fees and dispensing tickets which comprises:

an isolated, stand alone, automated fee collection and ticket dispensing device adapted for operating in a plurality of operational modes, comprising:

a power supply;

a durable protective enclosure having locking means for securing an access door;

a fee collection means for collecting a payment from a user and providing change as necessary;

a first output device adapted to modify a first ticket stored in said dispensing device;

a second output device adapted to modify a second ticket stored in said dispensing device;

a dispensing chute with a first aperture to receive the first ticket outputted from said first output device, and a second aperture to receive the second ticket outputted from said second output device, said dispensing chute further comprising a dispensing tray, extending outside of said protective enclosure which allows the first ticket and the second ticket to be discharged from the dispensing chute;

an air flow dispensing means in operable communication with said dispensing chute and a power supply, wherein upon receiving a signal, said air flow dispensing means provides air flow within said dispensing chute, wherein the first ticket and the second ticket are dispensed from said dispensing chute; and a computer positioned within said durable protective enclosure and operably interconnected to at least said fee collection means, said power supply and said first output device and said second output device.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

FIG. 5 is a front elevation view of the receipt/decal chute with attached dispensing chute blower;

FIG. 6 is a right elevation view of the receipt/decal chute shown in FIG. 5;

FIG. 7 is a front elevation view of a bayonet coin chute and mounting bracket;

FIG. 8 is a plan view of the bayonet coin chute shown in FIG. 7;

FIG. 12 is a flowchart illustrating the "pay by space" operating mode of the present invention;

FIG. 13 is a flowchart illustrating the "park pass" operating mode of the present invention;

FIG. 14 is a flowchart of a start-up routine according to an embodiment of the present invention;

FIG. 22 is a flowchart of menus available to the holder of a level 3 access card according to an embodiment of the present invention;

FIG. 23 is a flowchart of a software routine for handling a user emergency according to an embodiment of the present invention;

Figure 1:
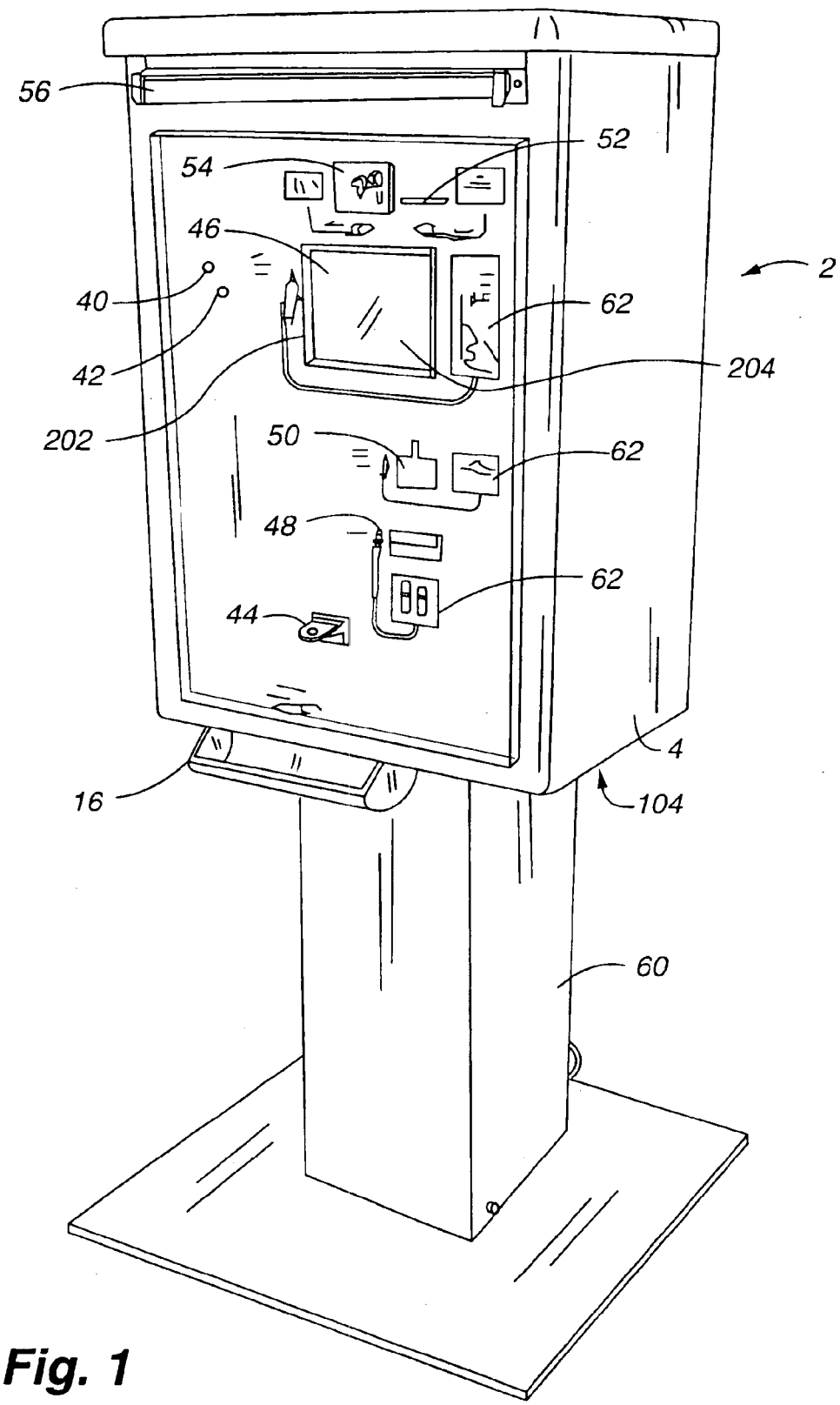
FIG. 1 is a front perspective view of an automated fee collection and ticket dispensing unit.

To assist the reader in the understanding of the present invention, the following list of components and associated drawings are provided herein for reference purposes:

| Component List | |
|---|---|
| 02 | Parking Meter/Ticket Dispenser Machine |
| 04 | Protective Housing |
| 06 | Computer |
| 08 | Computer Floppy Drive |
| 10 | Computer Serial Ports |
| 12 | Access Door |
| 14 | Door Hinges |
| 16 | Dispensing Tray |
| 17 | Cash Bag |
| 18 | Bill Acceptor |
| 20 | Bill Acceptor Chute |
| 22 | Coin Hopper |
| 24 | Coin Escrowing Dispenser/Chute |
| 26 | Receipt/Decal Dispensing Chute |
| 28 | Printer #1 |
| 29 | Printer #2 |
| 30 | Printer Paper/Receipt Roll |
| 31 | Bar Code Scanner |
| 32 | Magnetic Strip Card Reader |
| 33 | Door Hinge Bolts |
| 34 | Door Hinge Spacers |
| 35 | Bayonet Coin Chute |
| 36 | Radar Sensor |
| 38 | Interface Cable |
| 40 | Camera/Video Hole |
| 42 | Microphone |
| 44 | Lock Lug for Protective Cover |
| 46 | Lexan Screen |
| 48 | Bill Slot |
| 50 | Credit Card Slot |
| 52 | Voucher Slot |
| 54 | Coin Slot |
| 56 | Protective Door |
| 57 | Support Stand |
| 58 | Power Supply |
| 60 | Pedestal |
| 62 | Instructions |
| 64 | Door Weather Seal |
| 66 | Door Latch Cable |
| 68 | Coin Acceptor Chute |
| 70 | Printer Control Board |
| 72 | Latch Bolt |
| 74 | Heater |
| 76 | Dispensing Chute Blower |
| 78 | Access Door Hinge Spool |
| 80 | Protective Housing Hinge Spool |
| 82 | Hinge Pin |
| 84 | Bushing |
| 86 | Hinge Support Bar |
| 88 | Hinge Cavity |
| 90 | Bayonet Coin Chute First End |

| -continued | |
|---|---|
| Component List | |
| 92 | Bayonet Coin Chute Second End |
| 94 | Bayonet Chute Drainage Apertures |
| 96 | Bayonet Chute Mounting Bracket |
| 98 | Hinge Cavity Sponge Rubber |
| 100 | Hinge Weld Locations |
| 102 | Bayonet Coin Chute Coin Channels |
| 104 | Protective Housing Base Plate |
| 200 | Screen Assembly |
| 202 | Sealing Gasket |
| 204 | Touch Screen Matrix |
| 206 | LCD Enclosure |
| 208 | Heavy Gauge Washer |
| 502 | Hard Disk Drive |
| 504 | Sound Card |
| 506 | Removable Storage Medium |
| 508 | Communications Device |
| 510 | Offsite Personnel |
| 512 | Computers |
| 514 | Communications Link |
| 515 | Shock Sensor |
| 516 | Screen Display |
| 518 | Decal Dispenser |
| 520 | Camera |
| 522 | Speaker |
| 524 | Smart Card Readers |
| 526 | Power Supply |
| 528 | Backup Batteries |
| 530 | Defrosting Fan |
| 532 | Cooling Fan |
| 534 | Heater |

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION

In one embodiment of the invention, the protective housing 4 of the apparatus features rounded corners so that there are no sharp projections or protrusions. The design is therefore ergonomic, in that it is easy and pleasant to use. In addition, the design incorporates minimal labeling, reducing operational confusion. The case itself is constructed of heavy gauge, die-formed and reinforced cold rolled steel, with a durable color coating. The interior of the case is fully insulated to protect the internal components from the effects of extreme heat and cold, and to prevent condensation.

In addition to being insulated, the case also features ventilation holes at the top and bottom of the unit. These holes are vandal-proof and aid in cooling the interior of the housing in the summer and reducing condensation in the winter. In a particular embodiment of the invention, the ventilation holes in the top of the casing can be closed in the winter to limit the passage of cold air through the device while the ventilation holes in the bottom of the protective housing 4 remain open to allow condensation to escape.

The access door 12, like the protective housing itself, is preferably constructed of heavy gauge steel. The access door 12 is secured to the housing by means of a four-point locking system. This locking system may consist of two stainless steel hinge pins, and two latch bolts 74. A seal is formed between the access door and the housing by rubberized weather seals inset into a channel. These seals prevent moisture and dust from entering the housing itself.

Figure 3:
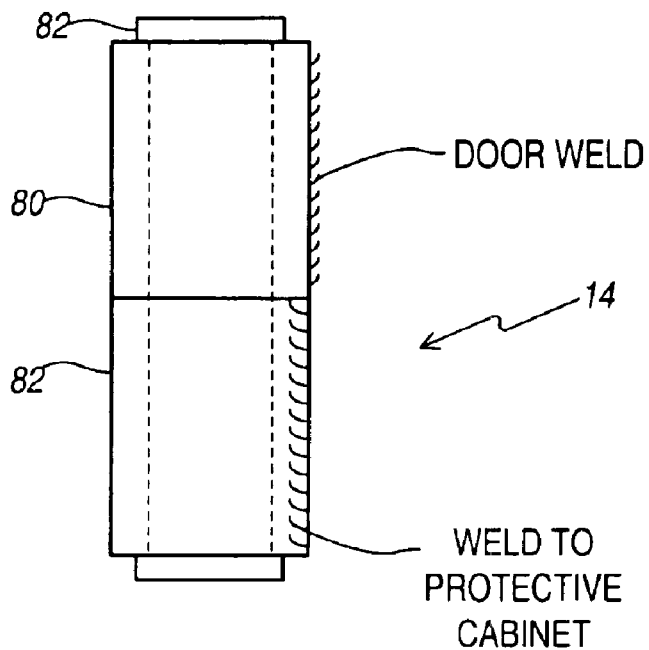
FIG. 3 is a front elevation view of the access door hinge assembly.
Figure 4:
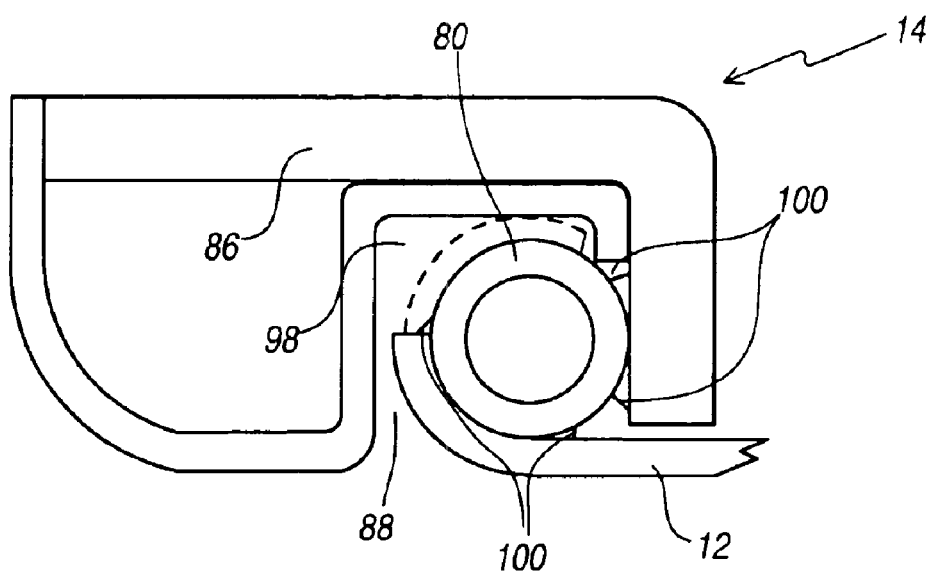
FIG. 4 is a top plan view of the access door hinge assembly.

Referring now to FIGS. 3 and 4, the access door hinges 14 are a novel internal design positioned within the access door 12 and protective housing 4 which prevents exposure to adverse weather and more importantly vandals. Thus, there are no pry points which would enable vandals and thieves from cutting or removing the door hinges 14 in an attempt to gain access to the money or expensive componentry contained within the protective housing 4.

Figure 2:
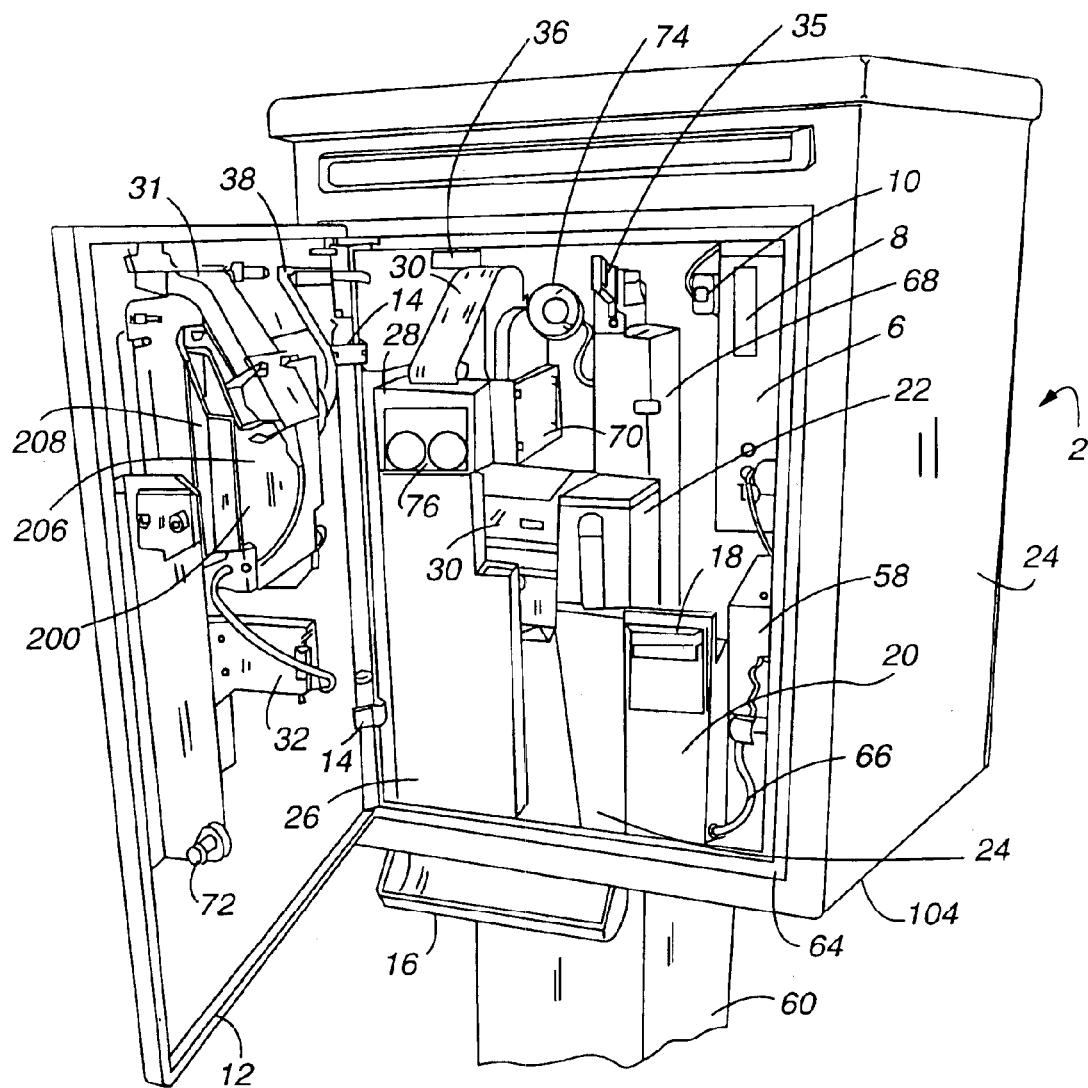
FIG. 2 is a front perspective view of the dispensing unit shown in FIG. 1 with the door opened and revealing the internal componentry.

Referring now to the drawings, FIG. 2 identifies the internal positioning of the access door hinges 14. The hinges 14 are generally comprised of three distinct components as seen in FIGS. 7 and 8. These include an access door hinge spool 78, a protective housing hinge spool 80 and a hinge pin 82 which slides through both of these spools to allow rotation of the access door 12. Generally, both the protective housing hinge spool 80 and access door hinge spool 78 have a cylindrical shape as seen in the drawings, while the hinge pin 82 is comprised of a cylindrical metal material such as brass.

A bushing 84 (not shown) may additionally be used between the access door hinge spool 78 and protective housing hinge spool 80 for adjustment of the elevation of the access door 12 with relation to the opening of the protective housing 4. During manufacturing, the protective housing hinge spool 80 is welded to a steel support bar 86 positioned within the protective housing 4 adjacent the access door hinge point. The protective housing 4 is shaped in conjunction with the steel support bar 86 to create a hinge cavity 88 which cannot be seen or accessed from the exterior of the parking machine and thus prevents tampering.

The access door hinge spool 78 is in turn welded to the steel access door 12 along the curved circumference of the access door hinge spool 78, which allows the necessary rotation of the access door and hence opening of the access door 12, yet preventing any access to the hinge mechanism from the exterior of the protective housing. To provide a weather tight seal, and to additionally prevent tampering, sponge rubber 98, or other similar weatherproof material, is positioned with the hinge cavity 88 to prevent moisture from entering the hinge cavity 88.

To remove the access door 12 for servicing or maintenance of the parking meter, the hinge pin 82 is simply removed by pushing the hinge pin 82 upward, thus releasing the access door hinge spool 78 from the protective housing hinge spool 78. In combination with the access door hinge mechanism 14, the access door is secured to the protective housing 4 by use of a door locking mechanism. This system preferably utilizes an electronic locking mechanism which may be activated by a password or smartcard, and preferably includes two electronic latches positioned within the protective housing 4. The electronic latches engage a latch bolt 72, which is positioned on the access door 12 as seen in FIG. 2. The password is entered by touch pad on the front of the machine. In either scenario, upon validation by the computer positioned within the machine, the door is opened electronically by a signal being sent to a solenoid from the computer master memory unit (MMU). If manual entry is required due to any form of power failure the door can be opened by removing a key hole plug and inserting a door plunger tool which releases the latch lever, thus opening the door.

The base plate 104 of the protective housing 4 may be constructed from steel plate that is heavier than that used in the protective housing 4 itself or in the access door 12. The base plate 104 may include a pedestal access hole, providing for easy access to components contained in the pedestal 60 itself. The pedestal access hole also provides for easy wiring, installation and servicing of the device. The configuration of the pedestal itself may be modified for use in a variety of applications, and to provide for a variety of particular needs. For example, the height of the pedestal 60 may vary depending on whether the device is configured to comply with ADA standards, or for conventional walk-up access. In addition, where the device is to serve as a free standing unit, the system battery backup, line conditioner, and transformer can all be located within the pedestal.

In a further aspect of the invention, multiple electronic features are provided. A watchdog timer is used to ensure that all components are in an operational state. This timer will reset the device if a particular component is not found to be in an operational state. At the same time, the watchdog timer can notify a remote system host computer via modem if it is unable to activate the device to ensure its operational status.

In a further aspect of the invention, Hall effect or reflective optical sensors may be used to monitor the opening and closing of access doors on the device. For instance, such sensors may be used to turn on lights to illuminate the interior of the case when the access door is opened. Such sensors may be combined with a sensor that detects the level of ambient light, to activate the interior light only when ambient light conditions are low.

Furthermore, sensors are used to detect the presence or absence of various components and optional equipment. For instance, the system is capable of sensing whether a cash bag 17, bill acceptor 18, coin hopper 22 or coin acceptor 54 are present. Additional equipment that may be sensed includes printers 28 and 29, smartcard and credit card readers 32, bar code scanners 31, keypads, AC power supplies, solar panels, and additional battery packs. By sensing the absence or presence of such equipment, modifications to devices that have already been installed may be made easily, without requiring modifications to the system board or the controller. Also, the information concerning the installed equipment may be used to determine whether the system needs to signal the operation of various door latches. Also, where printers are detected, procedures to bring the printer heads to operating temperature may begin at the early stages of fee selection by a user, reducing the time required to complete a transaction.

In another aspect of the present invention a unique bayonet coin slot 35 is provided which is essentially vandal proof. The position of the bayonet coin slot 35 may be seen in FIG. 2, while more detailed drawings are provided in FIGS. 7 and 8. FIG. 7 is a front elevation view of the bayonet coin chute 35, while FIG. 8 is a plan view of the bayonet coin chute 35. More specifically, the bayonet coin chute 35 has a first end 90 which is positioned adjacent the coin slot 54 when the access door 12 is closed. The bayonet coin chute 35 has a second end 92 which is positioned adjacent to a coin acceptor chute 68 and thus sorts, counts and stores coins submitted by users of the parking meter/ticket dispensing machine 2.

One common problem with prior art coin chutes are their susceptibility to vandalism and damage. For example, chewing gum, paper, glue and other foreign substances and contaminants are often poured or dumped into the coin chute which either temporarily or permanently disables the machine.

The bayonet coin chute 35 provided herein substantially eliminates these concerns by having a design which utilizing opposing metallic channels 102 which define the chute for the coins. One of the channels 102 reciprocates within the other channel 102 and which can be totally removed from the other channel 102 and bayonet chute mounting bracket 96 by a quick pull from the service attendant. The opposing metallic channels are oriented between the coin slot 54 positioned on the door and the coin acceptor chute 68 by the use of one or more mounting brackets 96, which are oriented to create a natural elevation drop as the coins travel to the coin acceptor chute 68.

To help prevent clogging, if fluids such as glue or other contaminants are introduced into the coin slot 54, the bayonet coin chutes metallic channel 102 has a plurality of drainage apertures 94 which allow the foreign material to drain prior to traveling into the coin acceptor chute 68 or otherwise damaging the bayonet coin chutes 35. Additionally, to facilitate quick removal of the one reciprocating metallic channel 102, a small handle or finger pull tab may be interconnected to the first end 90.

When the coins travel from the bayonet coin selector first end 90 to the second end 92, the coins fall into the coin acceptor/changer 68. This device reads the coins to determine the amount and value of the change and whether or not it is sufficient for the parking space, permit or other activity. Additionally, the coin acceptor/changer can be used to dispense change out the dispensing tray 16 if programmed for that function.

More specifically, however, the coin hopper 22 is used for dispensing change if overpayment occurs by the user of the parking meter/ticket dispenser. The coin hopper 22 is pre-loaded with a plurality of different coins, including quarters, nickels and dimes, to provide change as necessary during use of the machine. Likewise, the bill acceptor 18 receives legal tender, determines the denomination of the currency and whether or not change is required based on the price of the parking ticket or permit. The bill acceptor 18 also serves as a storage bin for the paper currency inserted by users into the bill acceptor 18 and can typically hold up to 1000 separate bills. The bill acceptor 18, coin acceptor/changer 68 and coin hopper 22 are all in communication with the computer 6, and thus transmit a signal if they become full, or empty, as the case may be, and then require service. A signal is then sent via modem to a command station at a predetermined phone number that service is required with the machine, and the nature of the service required.

In another aspect of the present invention a novel receipt/decal dispensing chute 26 is provided which utilizes a dispensing chute blower 76 as seen in FIGS. 5 and 6. Due to the presence of static electricity, and especially in dry climates, the receipts, decals, and tickets dispensed in the machine have a likelihood of sticking to the walls of the dispensing chute 26. This frustrates patrons of the machine, promotes damage and vandalism and can inadvertently clog the dispensing chute of subsequent users. To alleviate this problem, one or more dispensing chute blowers 76 are mounted on top of the dispensing chute 26 and which blow air down the dispensing chute 26 to drive dispensed tickets to the dispensing tray 16. As seen in FIG. 6, the blowers 76 are useful in pushing tickets/receipt/decals from printer #1, printer #2 or printer #3, or all three depending on the application.

Typically, dual centrifugal blowers are utilized which are interconnected to the power supply and which are in communication with the machines computer. When the machine is activated by the acceptance of coins, legal tender or credit card, the necessary receipt, decal or ticket is printed. Upon printing a signal is sent from the computer which activates the two blowers for a predetermined period of time to blow the dispensed tickets downward through the receptacle dispensing chute 26 into the dispensing tray 16. Each of the dispensing chute blowers 26 are generally capable of displacing 1–3 cubic feet of air per minute, and generate on about 0.10–0.20 amps.

Referring again to FIG. 1, the Lexan screen 46 of the touch screen assembly 200 is shown installed in the door 12 of the ticket dispenser 2. A sealing gasket 202 is positioned about a perimeter of the Lexan screen 46 to create an interface between the Lexan screen 46 and the swinging door 12. According to one embodiment, the gasket 202 is beveled, so that moisture cannot collect on the gasket 202. The gasket 202 can be constructed from an elastomeric material to accommodate the different coefficients of friction of the Lexan screen 46 and the door 12.

According to one embodiment, the Lexan screen 46 is overlaid by a touch screen matrix 204. The touch screen matrix 204 may be a known, resistive type device. Alternatively, a capacitive type touch screen matrix may be placed over a back side of the Lexan screen 46, thereby providing a touch screen 200 that is more resistant to damage than an embodiment using a resistive type device.

Referring now to FIG. 2, the back side of the touch screen assembly 200 is shown. In particular, the LCD enclosure 206 of the liquid crystal display of the touch screen 200 is visible. According to one embodiment, the liquid crystal display uses thin film transistor technology to provide a bright and easily read display. The LCD enclosure 206 is preferably constructed from stainless steel or some other corrosion resistant and high strength material, to prevent access to the interior of the protective enclosure 4 by punching through the touch screen assembly 200. In addition, a heavy gauge washer 208 is provided about a perimeter of the touch screen assembly 200. The washer 208 is held to the interior of the door 12 by bolts. When the bolts are tightened, the washer 208 forces a flange provided on the perimeter of the enclosure 206 against the gasket 202, thereby securely holding the gasket 202 between the interior of the door 12 and the enclosure 206. The tight seal thus formed prevents the entry of fluids into the interior of the machine's 2 protective enclosure 4. In addition, the relatively heavy gauge washer 208 strengthens the perimeter of the touch screen enclosure 206, further enhancing the security of the machine 2.

In one embodiment of the present invention, the touch screen assembly 200 is a large "bright view" custom color LCD touch screen assembly. This type of screen provides superior full-color video text and images. The screen uses a thin film transistor active matrix technology which has the additional advantage of providing a wide angle of view. Also, this screen provides superior viewing in bright sunlight. Additionally, the brightness of the screen may be adjusted according to the amount of ambient light. Potential impediments to viewing the screen output, such as condensation or frost on the screen, are reduced by the temperature control systems built into the device, and by a thermostatically controlled cooling and defrosting fan assembly described more fully below.

Figure 9:
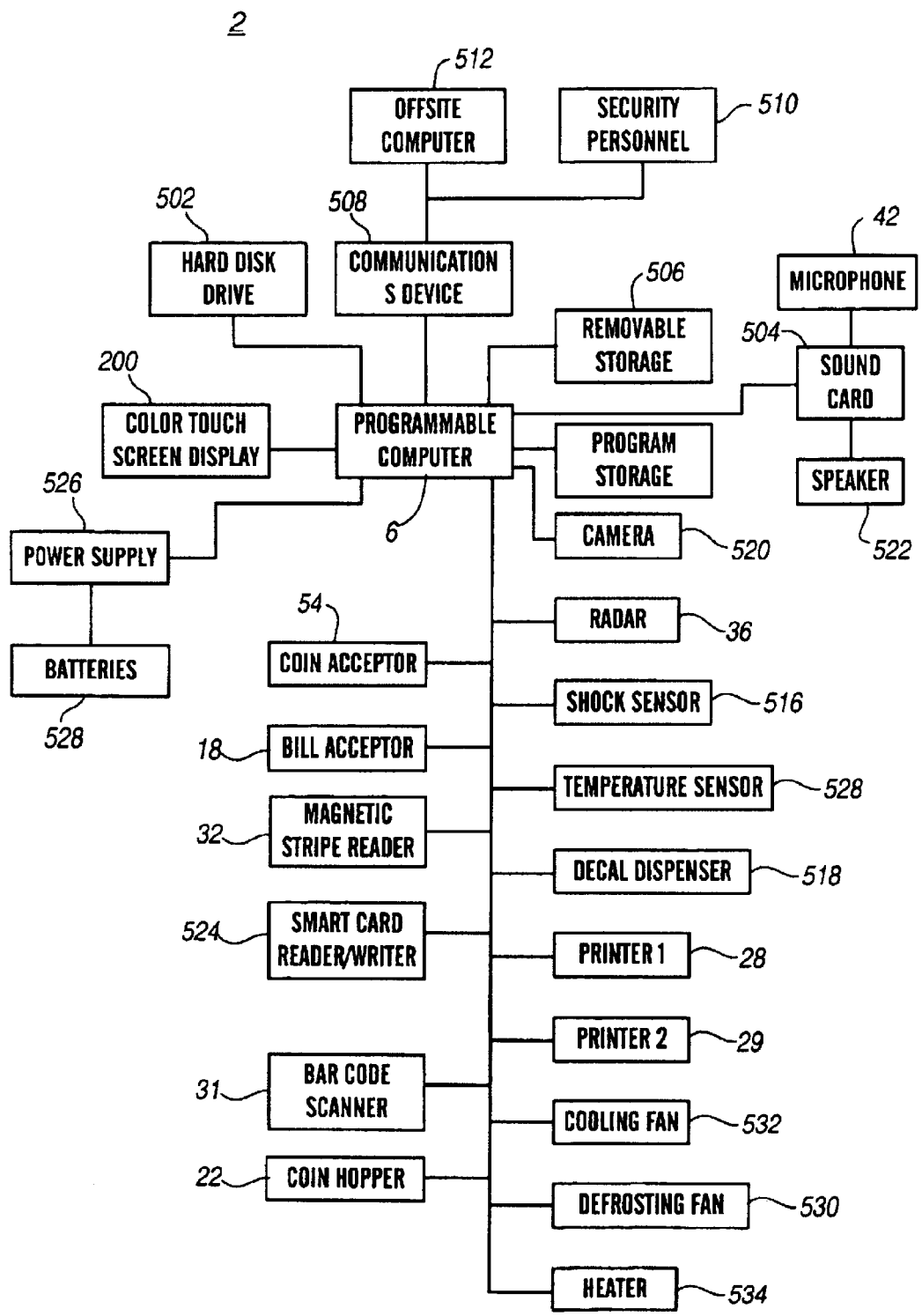
FIG. 9 is a schematic depiction of the operational components of the machine of the present invention.

Referring now to FIG. 9, the major components of an embodiment of the automated fee collection and ticket dispensing machine 2 of the present invention are illustrated. Central to the machine 2 is the programmable computer 6. As shown in FIG. 9, the programmable computer 6 is interconnected to a variety of devices. These devices can generally be grouped into input and output devices, network communications devices, and internal environmental condition monitoring devices.

In one aspect of the present invention, the machine 2 may include an integrated Pentium-type processor, sound capabilities, hard disk drive storage facilities, volatile and non-volatile solid state memory, video capture modules for system interface with a video camera, MITI ultra bright color LCD controller and module, and a full duplex digital voice modem. These features may be readily upgraded or expanded using available upgrade modules. System software may be backed up, downloaded, or uploaded, using commonly available removable media devices, such as floppy drives, "Zip" drives, or "Jazz" drives. System information may also be placed on the removable media to allow for the printing of comprehensive system reports at a central office. Such reports may include information regarding the usage of the device, as well as of operating conditions and system condition. Furthermore, the system is configured to have a fast boot-up time of 15 seconds or less and to reset automatically if there is a component glitch or if the system "hangs up". The system modem may be used to alert the host computer of a system problem. The modem may also be used to receive changes to the software from the host computer, such as changes in fee schedules.

In another aspect of the invention, the system controller board serves to interconnect the various electronic components of the device. In addition, the system controller board supplies power at a variety of voltages, to satisfy the various power requirements of the system components. The system controller board also converts communications signals to standard voltage levels, so that the signals may be read by associated communications equipment. For ease of maintenance and expandability, the controller board uses uniform connector types. Examples of systems and components that can be interfaced with the system controller board include computer networks, telephone networks, video cameras, and digital communications and control systems. The system board controller also provides for various analog inputs. Multiplexing of the provided serial ports is also supported by the controller board.

The programmable computer 6 may be any digital computer capable of executing files stored as software. As an example, the computer 6 may comprise an Intel Pentium 200 MHZ processor and an industrial, heavy-duty mother board, such as the Pentium PC-104 MMU mother board produced by the assignee of the present invention. The computer 6 may store executable files on a hard disk drive 502 having a capacity of about 3.2 gigabytes of data or greater. The computer 6 may also contain about 32 megabytes or greater of random access memory. Preferably, the computer 6 also includes a sound card 504 for processing audible signals. Additionally, the computer 6 may include one or more digital storage devices having a removable storage medium 506 such as a floppy disk drive 8, tape drive, flash memory card, or a high capacity removable disk drive such as the Zip or Jazz drives produced by i-Omega Corporation. Accordingly, it will be understood that the programmable computer 6 of the present invention may comprise what is commonly known as a personal computer. The programmable computer 6 also may include a communications device 508 such as a modem or network card to enable communications between the machine 2 and offsite personnel 510 or computers 512 over a communications link 514. Suitable communications links 514 include fiber optic cabling, twisted pair or coaxial network cabling, a land line or wireless telephone, a radio link, or any other link suitable for the transmission of digital data.

The computer 6 also provides connectivity for and control of various input and output devices. Thus, in addition to the sound card 504 described above, the computer 6 includes interface ports 10 for connecting external devices to the computer's 6 internal communications bus. These ports 10 may comprise any known serial or parallel communications protocol, such as universal system bus, RS 232, IEEE 1394, PCI, IDE, etc. In addition to these known interfaces, the programmable computer 6 of the machine 2 is, in a preferred embodiment, provided with a proprietary bus to enable the foolproof interconnection of various of the input and output devices to the computer 6. In general, this proprietary bus assigns each of a plurality of pins to a predetermined function. For example, pin 1 may provide a 5 volt power supply required by some peripheral devices, while pin 2 provides a 3.5 volt power supply, and pin 50 provides a ground. Thus, the power supply circuit of a first device may comprise active connections to pins 1 and 50, while the power supply circuit of a second device may comprise active connections to pins 2 and 50. Other pins may be assigned to receiving and transmitting information signals to and from peripheral devices. Thus, as an example, pin 3 may be dedicated to receiving the digital output of a shock sensor 516 that records when the device has been hit by a thief or vandal. Devices that should not be connected to certain of the pins simply have no connection to them. This system allows for devices to be plugged into any one of a plurality of receptacles on the bus, simplifying maintenance of the machine 2.

The computer 6 of the present invention also is preferably provided with an interface for allowing the computer 6 to communicate with various payment acceptance devices described in greater detail below. In general, this interface enables the computer 6 to process data in a non-standard format. For example, a nine bit plus parity format used by certain known coin acceptors. This is generally done by reading one byte, while storing the extra bit, and forcing a universal asynchronous receiver/transmitter (UART) in the serial bus to nine bits, after which the stored bit is added to the byte that has already been read.

Circuitry contained in the machine 2 preferably is optically isolated. By providing optical isolation, major components of the machine 2 can be protected from damage that might occur from over-voltages as a result of faults in other of the components.

The input and output devices operationally connected to the computer generally allow a user and the machine 2 to communicate. The input and output devices may include a color LCD touch screen display 200, various payment acceptors 18, 32, 54 a bar code scanner 31, printers 28 and 29 and a decal dispenser 518, radar proximity sensor 36, camera 520, microphone 42, speaker 522 and shock sensor 516.

The color LCD touch screen display 200 allows the machine 2 to present information to a user in textual or graphical form. The touch screen display 200 generally comprises a Lexan screen 46 overlaid by a resistive touch screen matrix and associated circuitry. Behind the Lexan screen 46 is located a liquid crystal display (LCD). The provided LCD has a particularly high brightness, which can be provided by using thin film transistor technology, to allow the screen to be read even in direct sunlight. The LCD is also capable of providing full color output. The touch screen display 200 is also capable of receiving input from a user. In general, the touch screen display 200 is capable of sensing where on the screen a user has pressed. Typically, areas of the screen are associated with "buttons" displayed by the LCD. In this way, a user may make selections depending on the particular display. As described more fully above, the touch screen function may also be implemented using a capacitive type touch sensor, which allows the touch screen circuitry to be located on the back of the Lexan screen 46, or any other method of providing a touch screen.

The user interface displayed on the screen 200 may consist of icons, presenting an easy to use graphical display to the user. In combination with audible direction from the device, ease of use is greatly enhanced. The machine 2 also allows for the presentation of a large number of options to the user in an easy to understand arrangement. Such features may include the ability to return to previous screens, advance to the next screen, access help features, access voice messaging or a voice intercom/phone connection with personnel at the central office, and to alert personnel of emergencies.

Because the video display screen 200 allows for touch screen input from the user, the machine 2 can present the user with an electronic keyboard when information such as the license plate number of the user's vehicle must be entered. This offers additional advantages, as separate mechanical or electronic touch pads need not be provided on the exterior of the device. Thus, maintenance costs are reduced, the potential for vandalism is diminished, and the keyboard is infinitely configurable to adapt to particular applications.

In a further aspect, the video display system 200 of the device allows for multi-level screen messaging. Thus, information may be presented to the user on an as-needed basis. For example, where a user is purchasing a camping permit, once the user informs the device that such a permit is desired, only information pertinent to such a transaction is displayed. Of course, the user may manually return to the screen where the initial selection of permit type was made to select alternative or additional types. Additionally, the system may provide further options to the user after a transaction has been completed, thus allowing for multiple transactions during each session.

The speaker 522 and microphone 42 are generally associated with the sound card 504. The provision of a speaker 522 enables the machine 2 to provide voice prompts and commands to a user. The provision of a microphone 42 allows a user to provide voice commands to the machine 2 and to communicate with personnel over a communications link established by the machine 2. This also allows the machine 2 to dial 911 in any emergency, as described in greater detail below. The camera 520 enables the recordation of visual images, either still or moving, of users. This capability is useful in apprehending vandals or thieves who have targeted the machine 2, and thus can also serve as a deterrent from such crimes. The shock sensor 516 may be used to identify attempts at breaking into the machine 2, and thus can be used to trigger an audible warning or the operation of the camera. A radar sensor 36 is provided to wake up the machine 2 when patrons approach, allowing the machine 2 to conserve energy and to greet users.

The input and output devices also include various payment acceptors. Examples of payment acceptors suitable for use in the machine 2 include coin acceptors 68, bill acceptors 18, magnetic card readers 32, and smart card readers 524. The coin and bill acceptors 54 and 18 are configured for receiving various denominations of domestic and foreign currency. Typically, these devices are configurable to accept selected denominations. Where a transaction requires that change be issued to a user, change can be supplied either from the coin acceptor 68 or a separate coin hopper 22. In addition, the machine 2 provides for the issuance of vouchers, to be explained in greater detail below. The magnetic card reader 32 can be used to read credit card information, driver's license information, or information from proprietary systems, from magnetic strips. The smart card reader 524 is capable of exchanging information with cards storing information in integrated circuits, such as flash memory. According to one embodiment, the magnetic strip card reader 32 and the smart card reader 524 share the same slot on the extension of the machine 2. The bar code reader 31 is a scanner adapted to read information contained in printed bar codes.

The input and output devices also may include various printers 28 and 29 and voucher, coupon, or decal dispensers 518. In a preferred embodiment, the printer or printers 28 or 29 use thermal transfer technology to produce printouts that maintain their legibility in a variety of atmospheric conditions, and with sufficient resolution to accurately print machine readable bar codes. Preferably, a plurality of printers 28 and 29 are provided to enable the machine 2 to produce output on a variety of stock, or to provide redundancy. The thermal printers can provide a wide variety of receipts and permit options, and the text of receipts may be custom generated for each particular transaction. Further, the format and length of receipts may be configured for the particular site in which the device is situated. Receipts may of course be used to provide proof of payment. Information that may be included on a ticket includes: transaction number, bar code identifier, name of park or agency, date and time of purchase, expiration date and time of permit, special park or agency logos or information, type of pass, credit card information, and various user messages. The output devices may also include dispensers 518 for issuing decals, pre-printed coupons or vouchers, stickers, or cards. The decals or stickers may be printed on durable material where annual or other long-term passes are being purchased, or may be die-cut into custom shapes. The custom capabilities offered by such printers also allows for the inclusion of serial numbers or other unique information on each pass or decal.

In a further aspect of the invention, the interior and exterior air temperature is monitored. This information may be used to control heaters 4 or fans within the unit itself. The heating and cooling features of the machine 2 may be programmed through the system software and commonly used thermostats. The machine 2 also monitors the level of ambient light at the liquid crystal display (LCD) 200. The system then adjusts the output of the LCD, depending on the level of ambient light detected.

The machine's 2 internal environmental monitoring devices generally include a power supply 526, a temperature sensor 528, a defrosting fan 530, a cooling fan 532, and a heater 534. The power supply 526 regulates and supplies power to the computer itself and to the various peripheral devices. Generally, the power supply provides a DC voltage of from about −12 volts to +12 volts from an AC power source. In addition, the power supply 526 or power processing unit regulates and charges the system's backup batteries 528. In an alternative embodiment, the machine 2 may be provided with additional batteries to enable sustained operation of the machine 2 without being connected to an AC power source. In yet another embodiment, the machine 2 may be provided with solar panels to operate the machine 2 and/or charge the batteries.

The operational capabilities of the machine 2 will now be described. Typically, when the machine 2 is not being addressed by a user or service personnel, it enters into a sleep mode in which the peripheral devices are held in an off or stand-by state. This reduces the power consumption of the machine 2, and is particularly valuable where the machine 2 is not connected to an AC power supply and is instead operated on batteries 528 or a combination of batteries 528 and solar power alone. If desired, the LCD may be operational to display a greeting or advertisement. According to an embodiment of the machine 2, the radar sensor 36 remains operational while the machine 2 is in sleep mode, so that the presence of a user can be detected.

The radar sensor 36 may be adjusted to detect the presence of users at varying distances, and may be a motion or radar-type sensor. The use of such sensors facilitates the automatic wake-up of the system and improves the user friendliness of the device, as it may be used to trigger an audible welcome message from the device, without the user having to touch the device itself.

When the radar proximity sensor 36 detects the presence of a user, the machine 2 is brought into an operating mode, and issues a verbal greeting. The verbal greeting is preferably output from the speaker 522 operatively associated with the computer sound card 524. According to this embodiment, the verbal greeting is stored as a digital file in memory associated with the computer, such as the hard disk drive 502. According to one embodiment of the machine 2, the greeting requests the user to select a desired transaction. At the time the verbal greeting is issued, the LCD screen 200 is configured to display a screen offering one or more selections.

According to a preferred embodiment, the machine 2 includes a variety of operational modes stored in the hard disk drive. The particular mode or modes that the machine 2 will be operated in when installed can easily be selected by setting an appropriate software switch. Typical installed operating modes include a "pay on foot" mode, "pay by space" mode, "pay and display", "park pass", and "theater" mode. In addition, the machine 2 may be provided with programs to enable the display of selected material (e.g. advertisements) when the machine 2 is not being used to complete a particular transaction.

A further optional aspect of the machine 2 is the ability to operate and control gates and other devices used to control physical access to areas. Thus, the machine 2 may be used to open and close access gates or spike bars.

Figure 10:
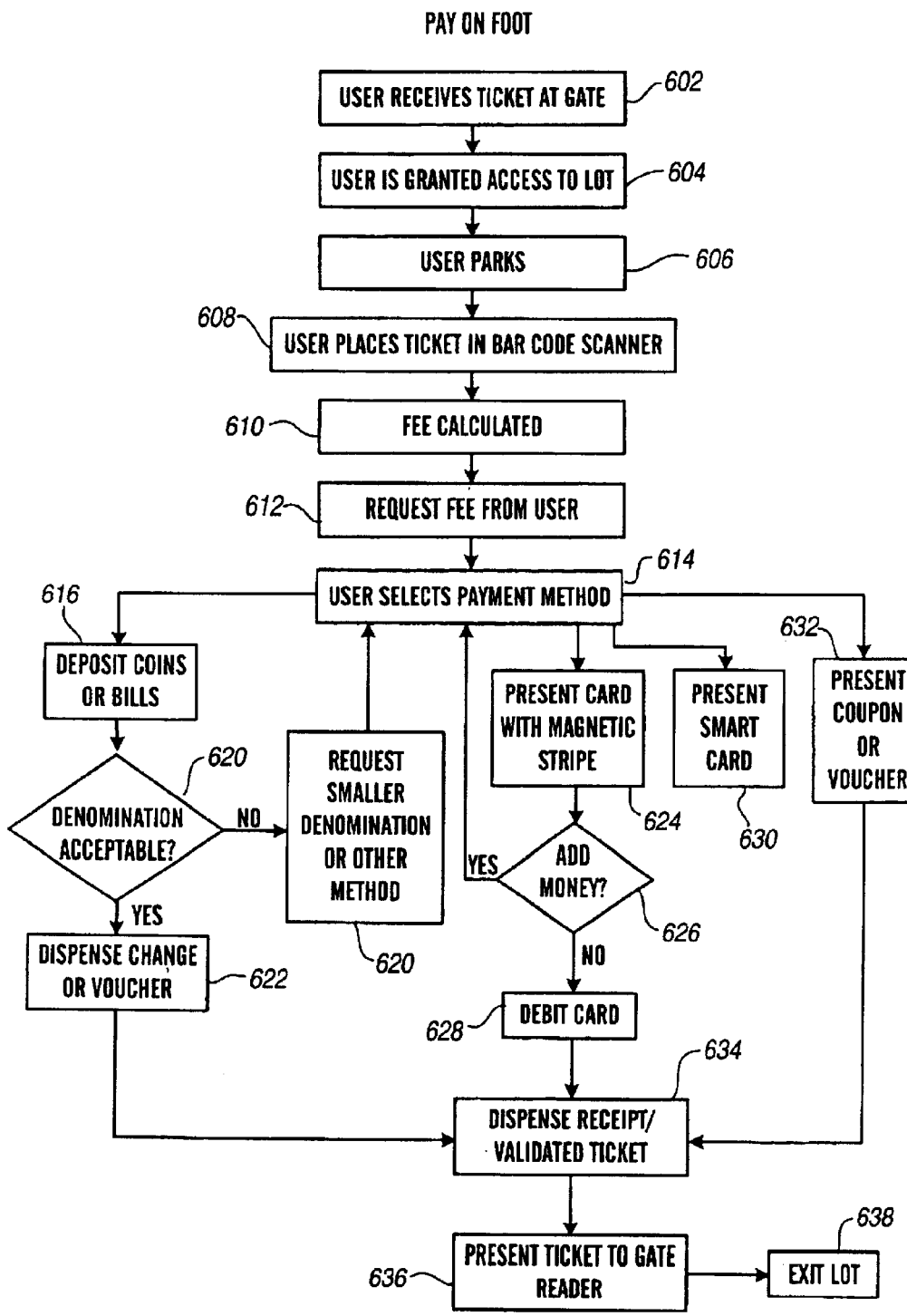
FIG. 10 is a flowchart illustrating the "pay on foot" operating mode of the present invention.

In one embodiment of the "pay on foot" operating mode, the major steps of which are illustrated in FIG. 10, the user has approached a parking area gate and received a ticket (step 602). This ticket generally includes information identifying the parking lot itself, the time and date at which the ticket was issued, a ticket number, and a machine readable bar code. In addition, the ticket may include other selected information, such as the name of the parking lot operator. According to an embodiment of the present invention, at least portions of the ticket are printed at the time it is dispensed to the user, rather than being entirely preprinted. According to a preferred embodiment, the ticket contains a machine-readable bar code but does not contain a magnetic strip. This is because omitting the need for a magnetic strip reduces the cost of the required card stock. Also, printing at the time the ticket is issued avoids the need to purchase and stock preprinted tickets, and allows fully customizable and easily modified indicia to be printed on the tickets. The user is granted access to the lot upon retrieving the ticket from the dispenser (step 604), and is then free to park his or her vehicle (step 606).

In order to remove a vehicle from the lot, the user must present a properly validated ticket to a reader positioned at the exit gate. Validation requires the user to take their ticket to the automated fee collection machine 2 and place the ticket into the machine's 2 bar code scanner 31 (step 608). The bar code scanner 31 enables the machine 2 to retrieve information concerning the particular lot at which the car is parked and the date and time that the vehicle was placed in the lot. Alternatively, the bar code may simply contain the individual ticket number, enabling the computer 6 of the machine 2 to retrieve location, date, time and other information associated with the ticket from a file written to by the ticket dispenser when the ticket was originally issued. Based on the information associated with the ticket, the fee collection machine 2 can calculate the fee due (step 610) and request that fee from the user (step 612). This request (step 612) may be made on the visual display screen 200 and/or audibly through the speaker 522. Depending on the installed payment acceptance devices, the user may then be provided with a plurality of payment options. The user may select the desired payment option (step 614) by selecting the appropriate displayed button on the touch screen 200, or by beginning payment using one of the provided devices.

For example, where the user desires to pay with cash, paper bills and/or coins can be entered through the appropriate receptacles 18 and 54 (step 616). Owing to the extreme flexibility of the machine 2, the currency denominations accepted can be varied (step 618) according to the fee due, or any other desired criteria. For example, the machine 2 may, through its software, be configured to accept a $20.00 bill in payment of a $9.00 parking fee, and to reject an attempt to pay a $2.00 parking fee using a $20.00 bill. A rejection may be communicated to the user (step 620) by the visual display 200 or the speaker 522, and preferably includes a request to pay using a smaller bill or some other method. This feature allows the machine 2 to conserve its ability to dispense change, thereby allowing the machine 2 to serve a greater number of patrons between servicings than a conventional vending machine. After an acceptable denomination has been provided, the machine 2 provides any required change (step 622). When the machine 2 has in fact run out of change, the machine 2 may instead dispense a voucher (step 622) to the user, good for parking at a later date or for a cash refund after the change supply of the machine 2 has been replenished. The voucher may contain a printed bar code to enable reading by the machine 2 at a later date. Preferably, the user is given the option of another form of payment before a voucher is dispensed.

A magnetic card reader 32 may also be provided for accepting payment (step 624). The magnetic card reader 32 is a known device that reads information from a strip of magnetic material commonly affixed to credit cards. Where access to an automated validation system is provided through a telephone line or other communications link, a credit card or debit card transaction can be completed at the time the card is entered. A receipt of a credit card transaction can be output using the associated printers 28 and 29.

Protection against electronic theft or fraud can also be provided. Thus, where the machine 2 is in communication with a bank or ATM system, it can be programmed to refuse acceptance of stolen or invalid credit or ATM cards. The machine 2 may also be used to notify a host computer via modem of attempts to use stolen or invalid cards. At the same time, the video camera 520 may be activated to capture an image of the person attempting to use the stolen or invalid card.

The magnetic card reader 32 can also be used in connection with payment cards issued by the operator of the machine 2. Typically, such cards are sold in denominations large enough to allow for several fee payments to be made without requiring the user to recharge the card using cash, a credit card, or other means. When it is necessary for a user to recharge the card, or when the user makes an initial purchase of the card, the automated fee machine 2 of the present invention may be used to complete the transaction (step 626). Thus, by entering the appropriate selection on the touch screen 200, the purchase or recharge of a fee card can be selected. The user may tender appropriate payment for the card by either paying cash through the coin 54 and/or bill 18 acceptor, or by making payment through a credit or debit card. Where the purchase of a new card is being conducted, the new card may be issued from a dispenser provided on the machine 2. When the transaction involves adding time to a previously issued fee card, the user may enter that card into the magnetic card reader 32, which can then write to that card the amount of additional time and/or money purchased by the user. Because of the extreme flexibility of the machine 2 of the present invention, a discount may be offered to the user for reusing previously issued cards, simply by changing the operating software. To complete payment, the charge or debit card account or the fee card is charged the amount due (step 628).

In addition or as an alternative to a magnetic card, payment may be made using a smart card reader 524 (step 630). In general, a smart card includes an embedded semi-conductor chip that stores information, such as the identity of the user, or an amount of money or time or other criteria. The smart card reader 524 may, in one embodiment, be accessed by a user through the slot used to access the magnetic stripe card reader 32. Similar to the example given above concerning a card having a magnetic strip for payment, the machine 2 of the present invention may accept payment of a fee through use of a smart card, and may additionally recharge and/or issue such smart cards. It should be understood that the term payment is used broadly herein, and that a smart card or magnetic access card could be issued that authorizes the holder to use a particular service for a limited or unlimited time and place, without being assigned a specific monetary value.

In discussing the various means provided for allowing users to make payment of a fee, it should be noted that the bar code scanner 31 serves as a device for accepting payment when it is presented with a proper coupon or voucher (step 632).

Continuing the example of the "pay on foot" operational mode, when a user returns to a parking lot to retrieve his or her car, after making payment, a validated ticket is issued (step 634). This validated ticket may be the identical ticket originally submitted by the user, with no changes. Where no changes are made to the ticket, the machine 2 will, upon receipt of proper payment, amend the internal records concerning the ticket to reflect payment in full. The system may then allow the user to open an exit gate by presenting the ticket to the bar code scanner or other reader associated with the exit gate (step 636), and the user exits the lot (step 638). The time allowed for the user to exit the parking lot may be limited to, for example, 10 minutes to deter a user from making early payment and then failing to retrieve his or her car. In a preferred embodiment of the machine 2, the ticket presented to the reader associated with the exit gate returns the ticket to the user. The user thus is provided with a receipt, and the machine 2 need not make provisions for the storage and eventual disposal of returned tickets. In an alternative embodiment, the ticket may be altered by the machine 2 of the present invention when it is presented for payment, such as by printing "paid" on the ticket in either or both human and machine-readable form.

In another operational mode provided on the machine 2 of the present invention, known as the "pay and display" mode, the user is issued a ticket for display in the window of his or her vehicle. In this operating mode, the user will preferably address the machine 2 before parking his or her vehicle. To facilitate use of the machine 2, it may be mounted such that it can be operated from the driver's seat of an automobile.

Figure 11:
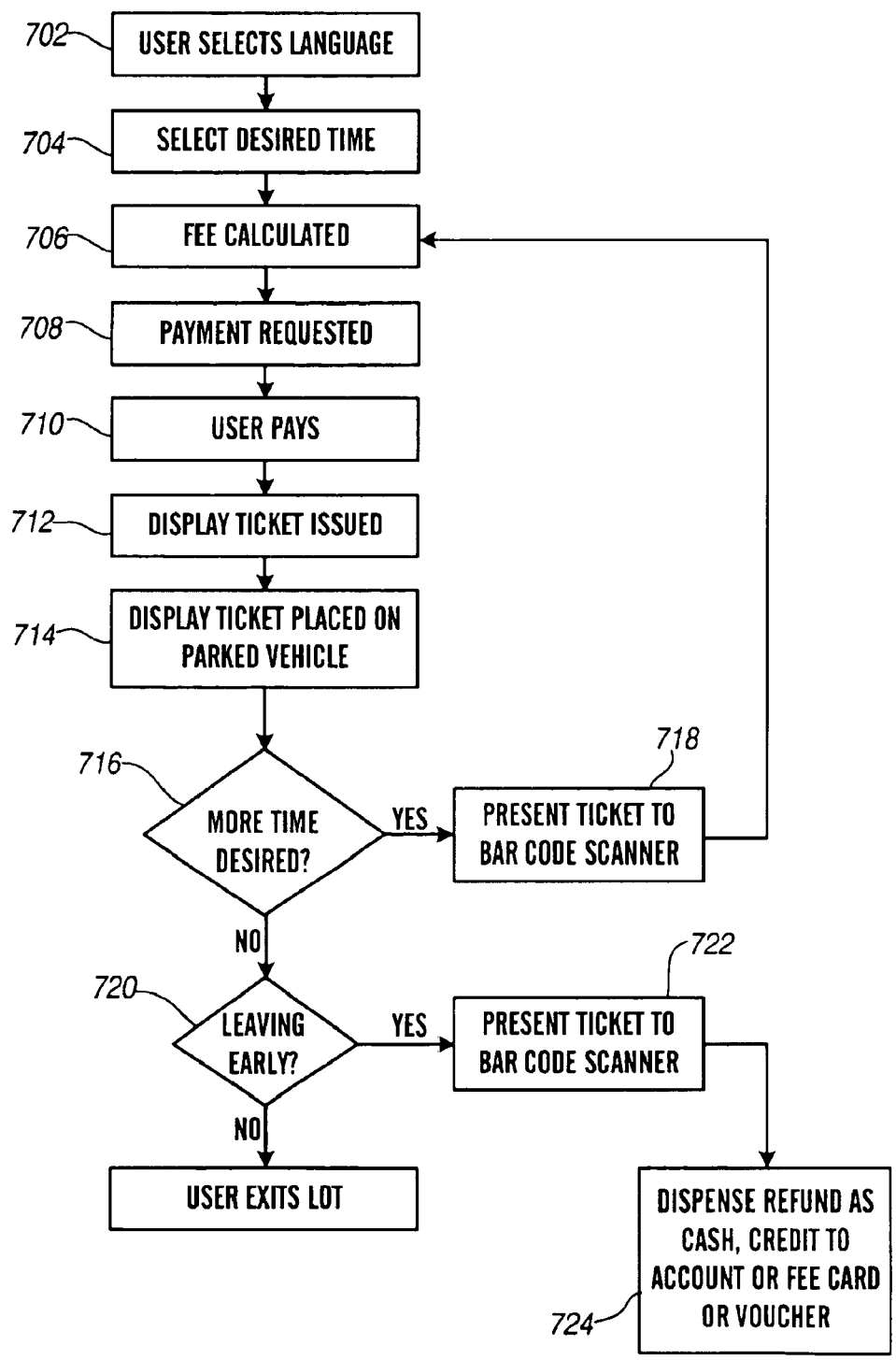
FIG. 11 is a flowchart illustrating the "pay and display" operating mode of the present invention.
Figure 15:
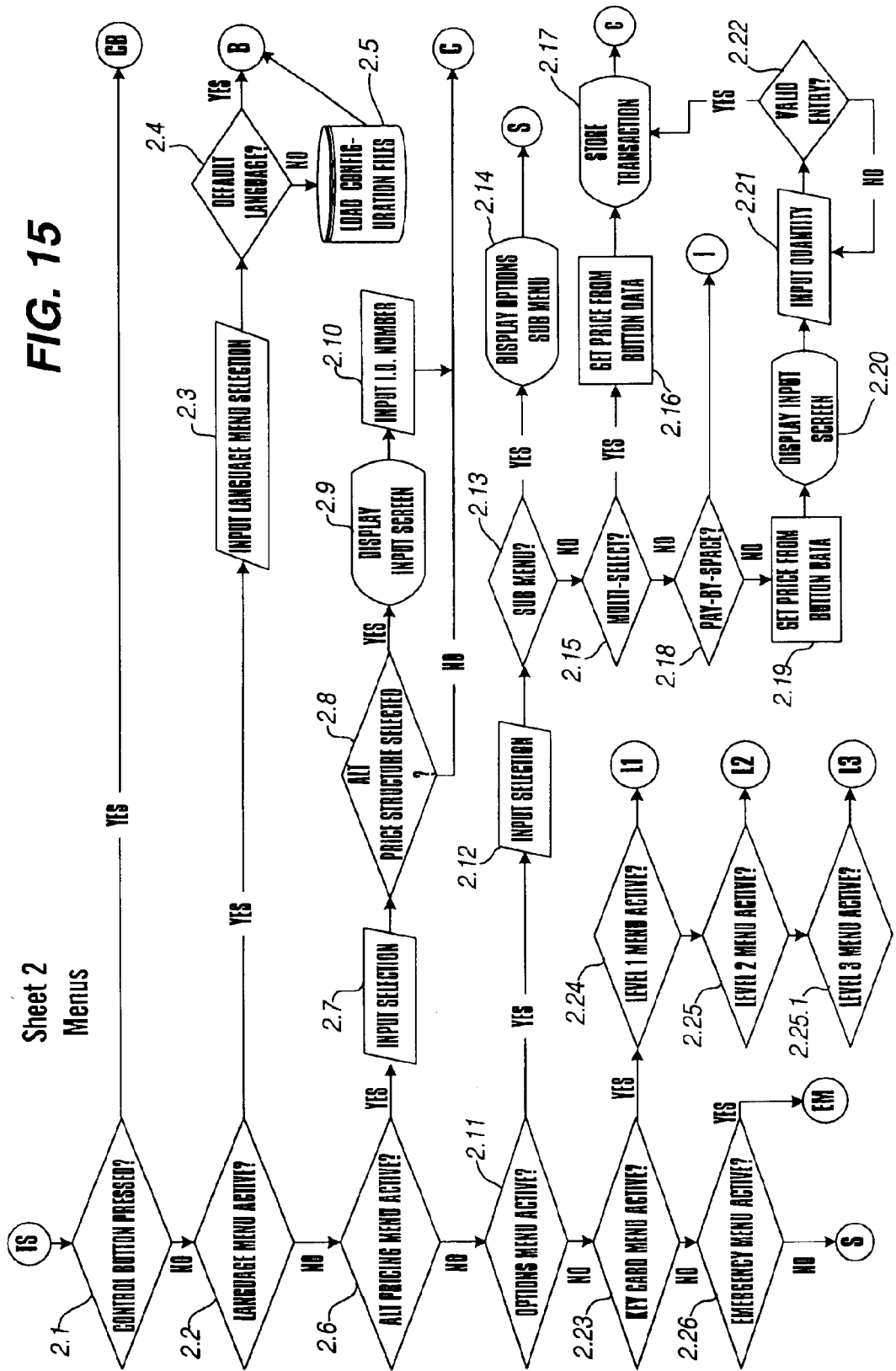
FIG. 15 is a flowchart of the menu hierarchy according to an embodiment of the present invention.
Figure 16:
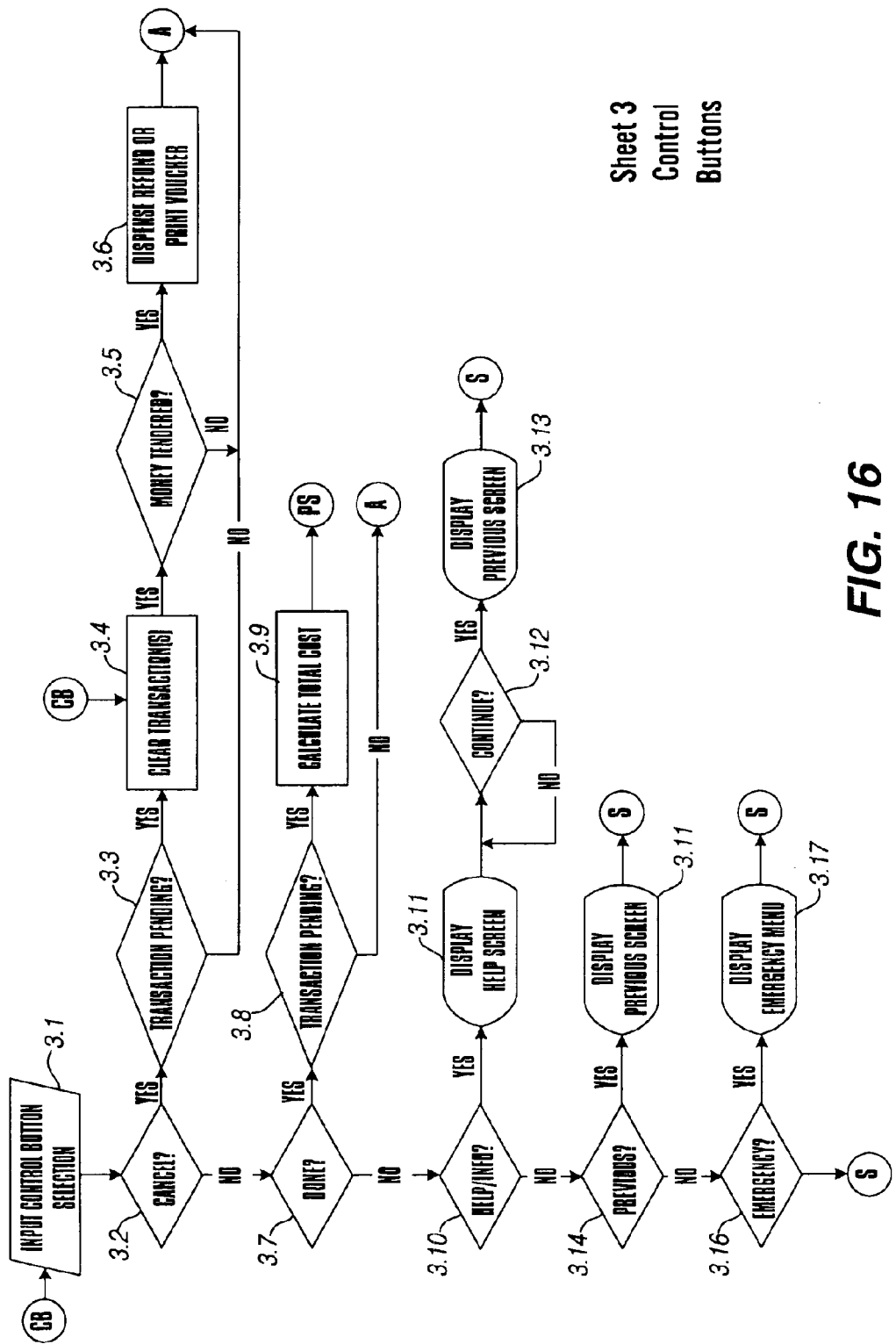
FIG. 16 is a flowchart illustrating a subset of the displayed control button selections according to an embodiment of the present invention.
Figure 18:
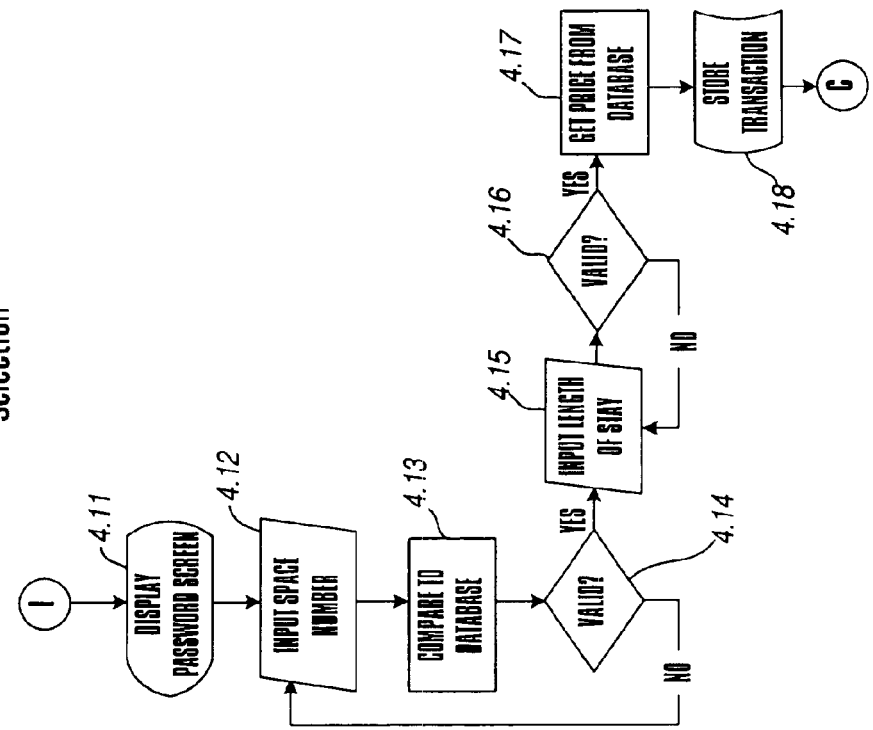
FIG. 18 is a flowchart of a software routine in a "pay by space" operational mode according to an embodiment of the present invention.
Figure 17:
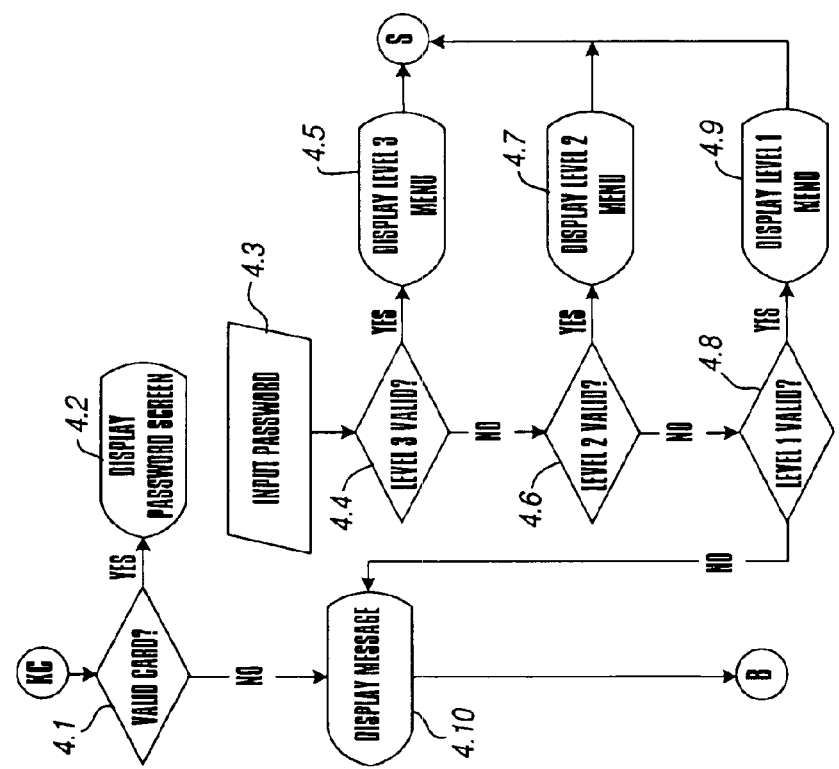
FIG. 17 is a flowchart illustrating a software routine for validating access key cards according to an embodiment of the present invention.
Figure 19:
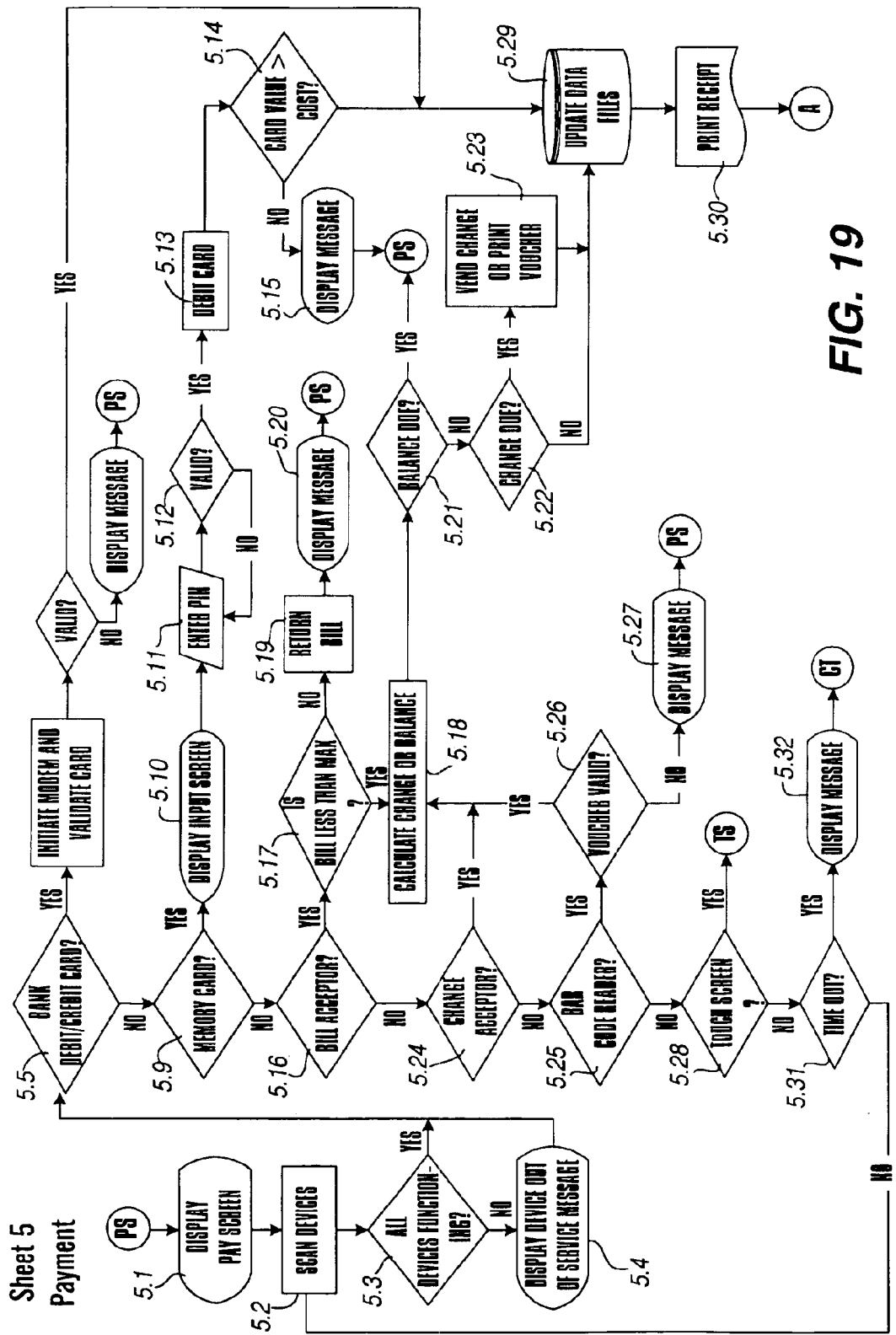
FIG. 19 is a flowchart of a software routine for receiving payment according to an embodiment of the present invention.
Figure 20:
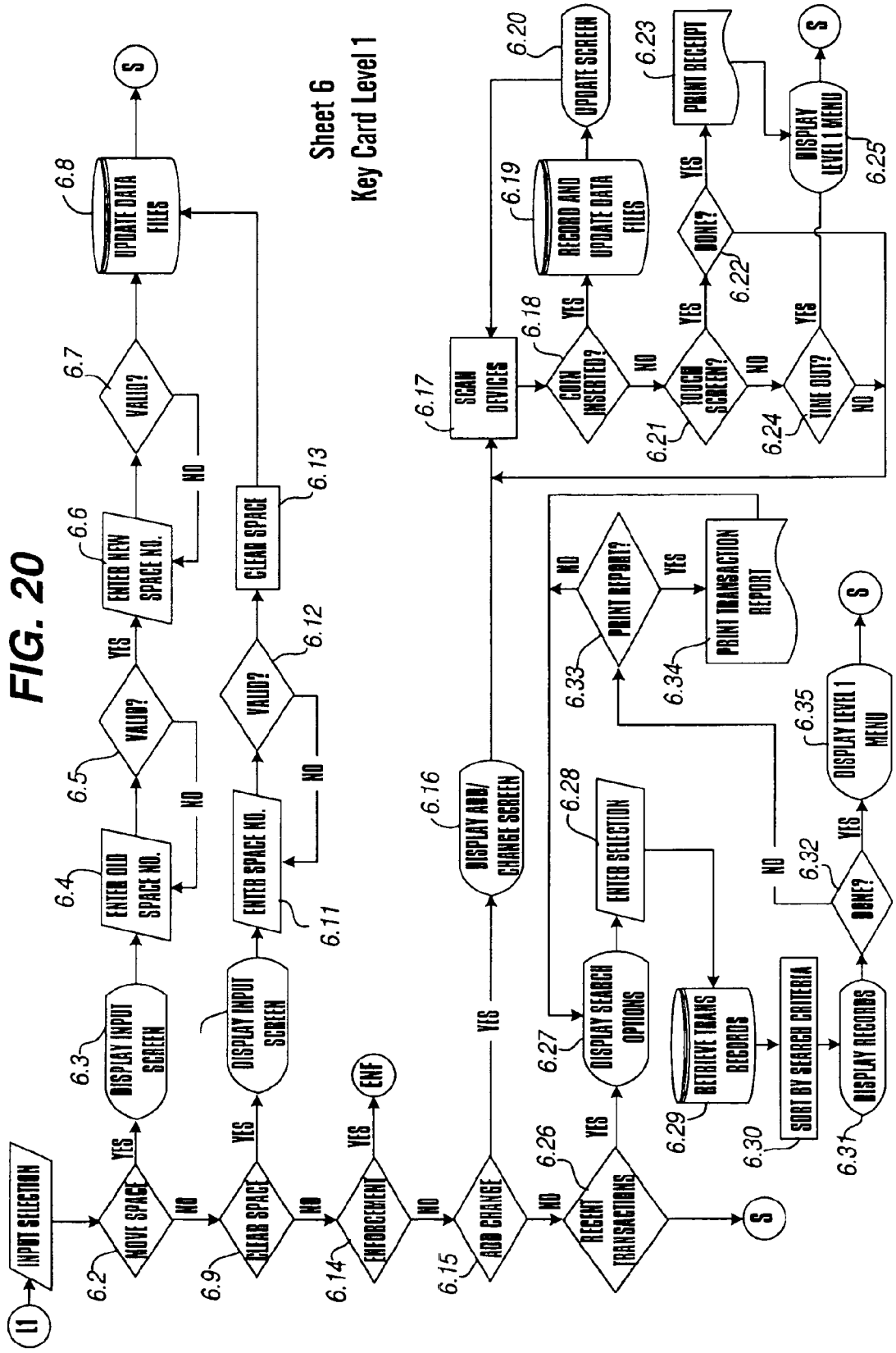
FIG. 20 is a flowchart of menus available to the holder of a level 1 access card according to an embodiment of the present invention.
Figure 21:
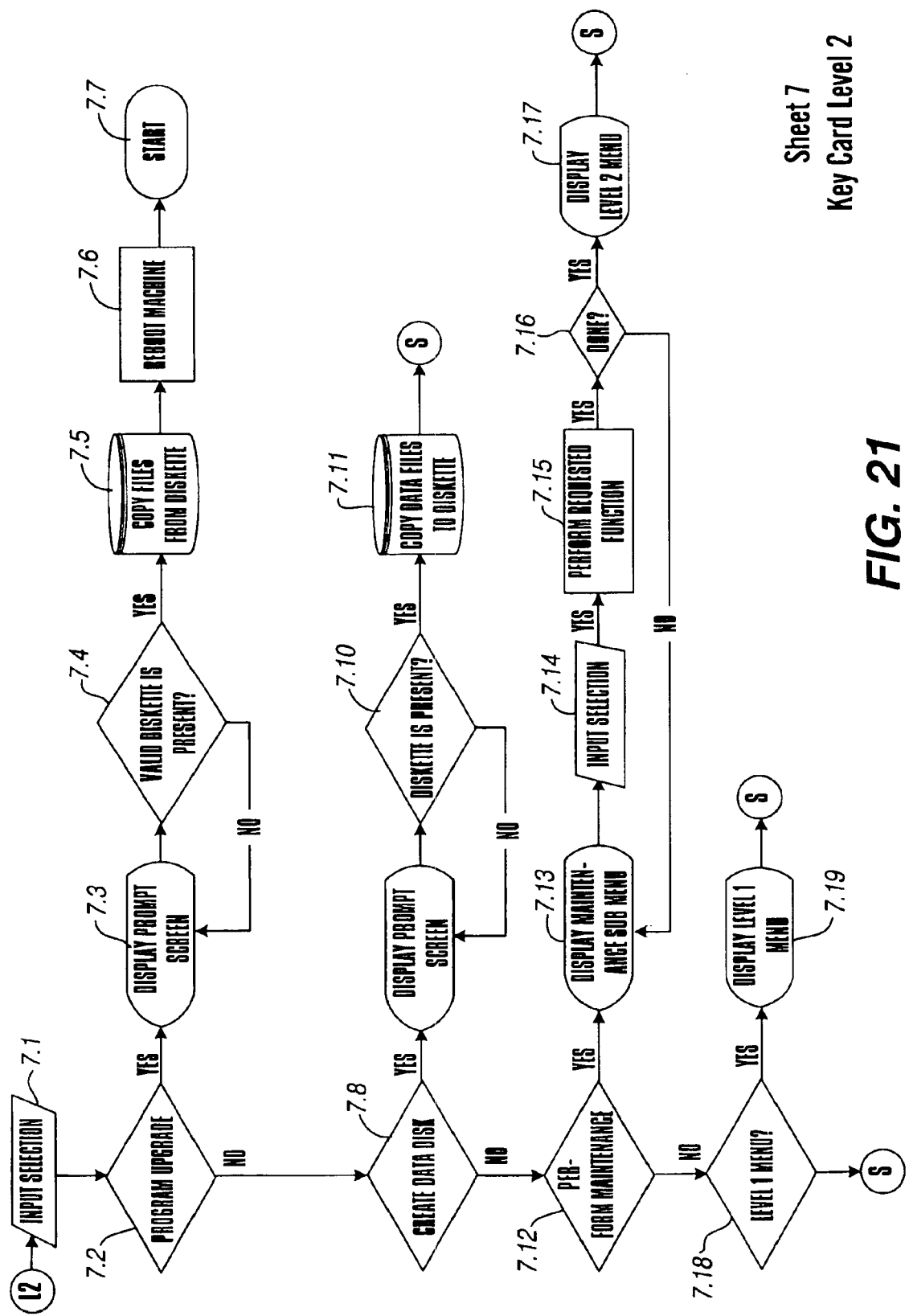
FIG. 21 is a flowchart of menus available to the holder of a level 2 access card according to an embodiment of the present invention.
Figure 24:
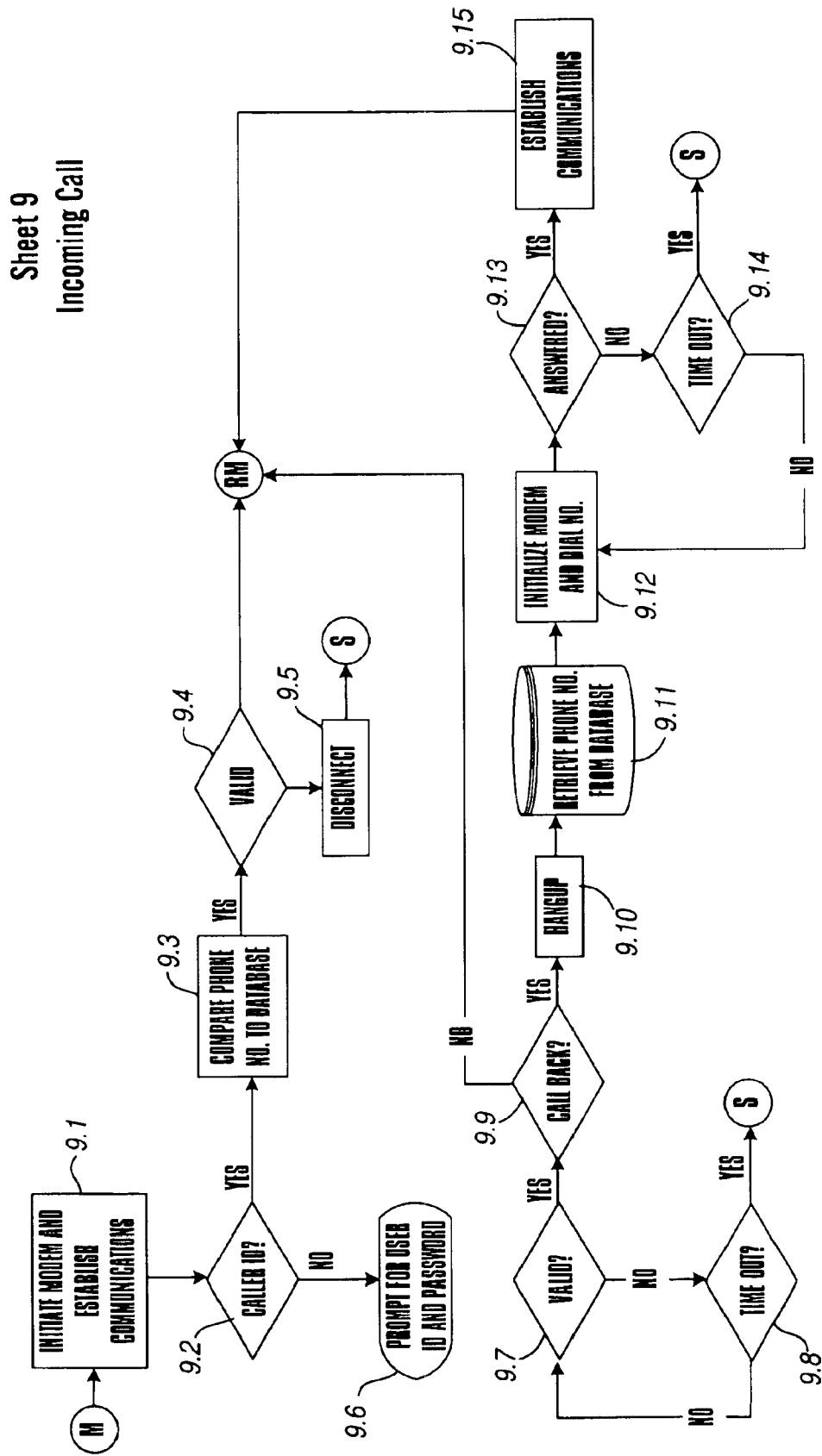
FIG. 24 is a flowchart of a software routine for handling an incoming call according to an embodiment of the present invention.
Figure 25:
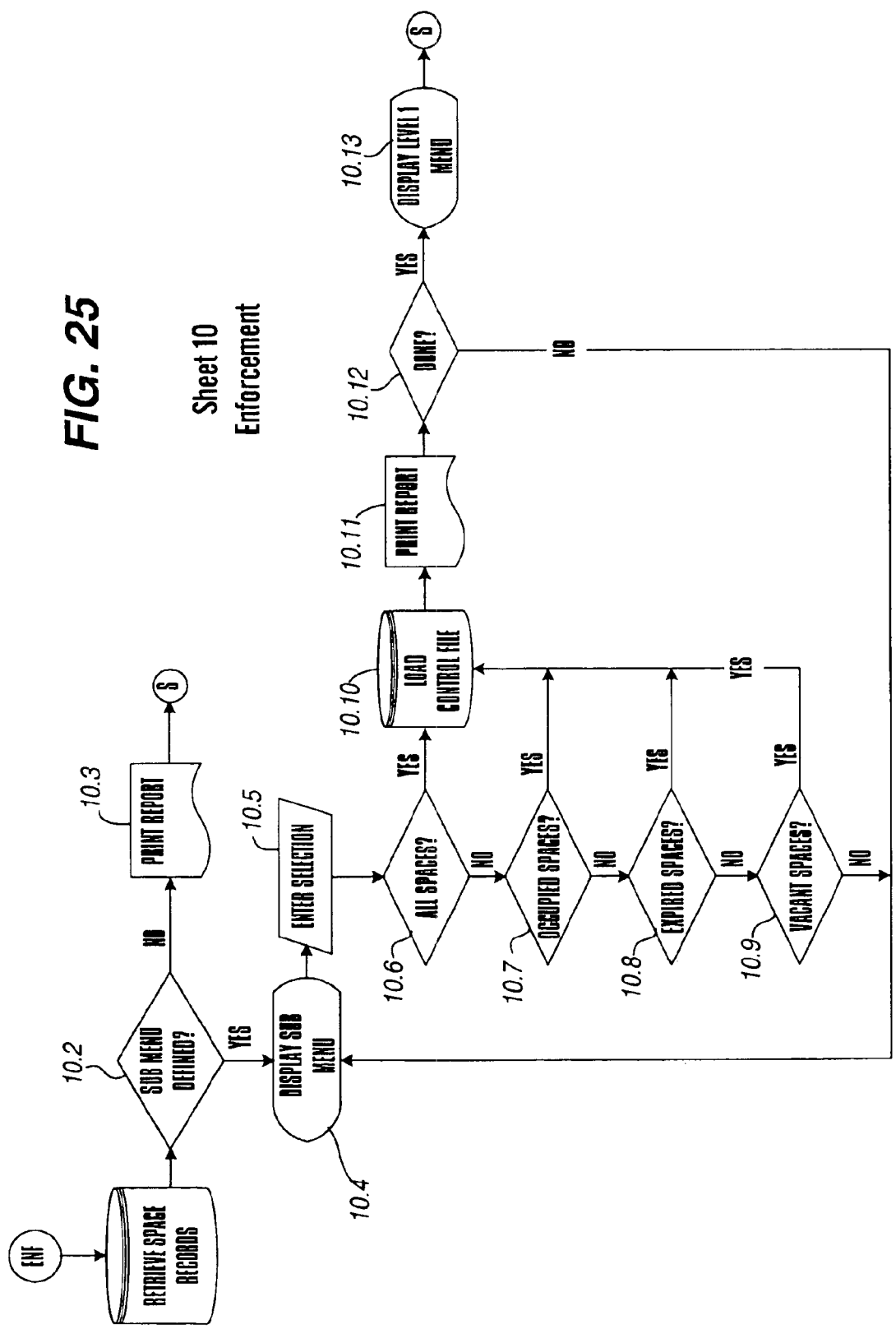
FIG. 25 is a flowchart of a software routine for providing payment enforcement functions according to an embodiment of the present invention.
Figure 26:
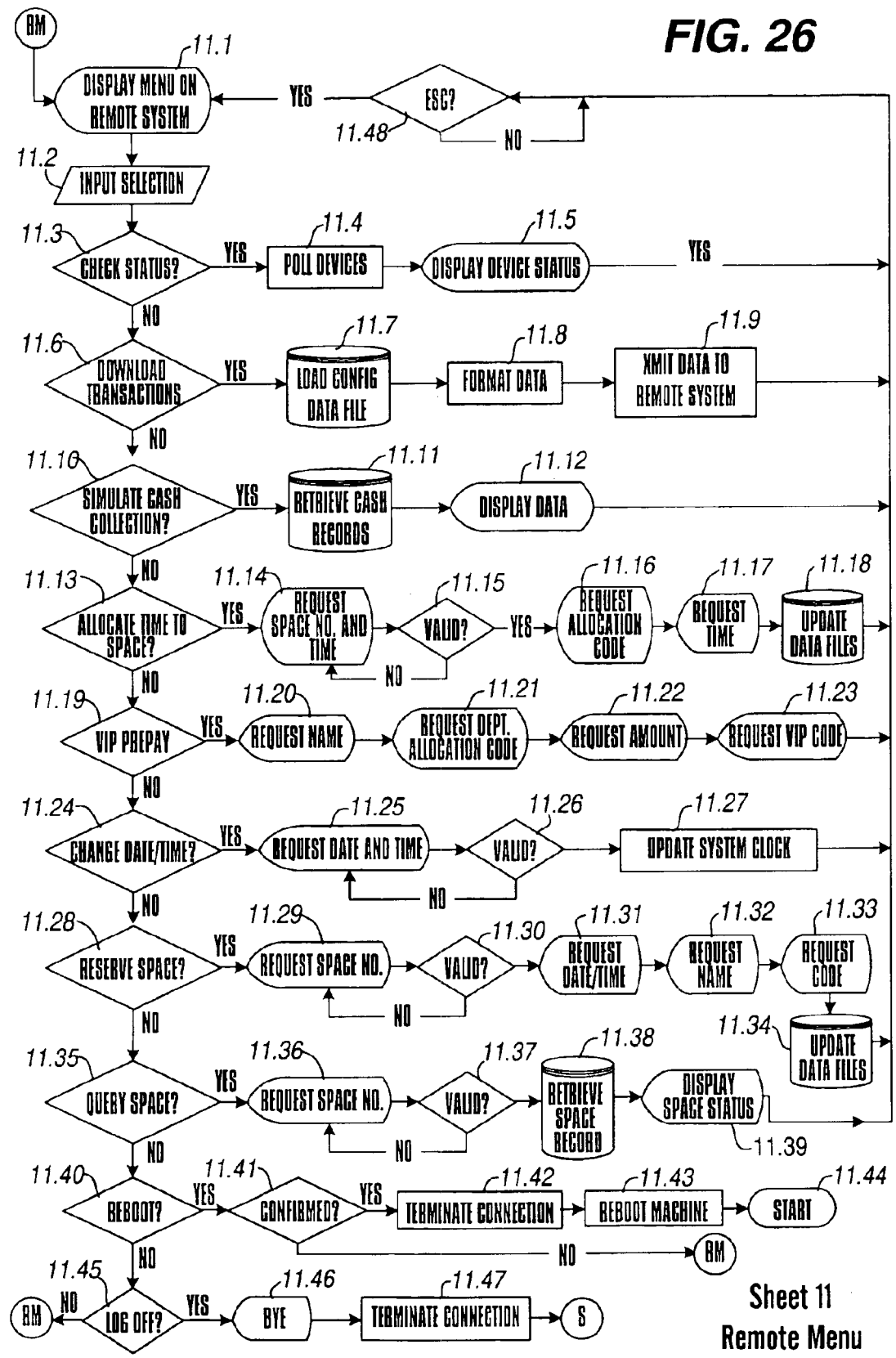
FIG. 26 is a flowchart of a software routine for providing remote operation menus according to an embodiment of the present invention.
Figure 27:
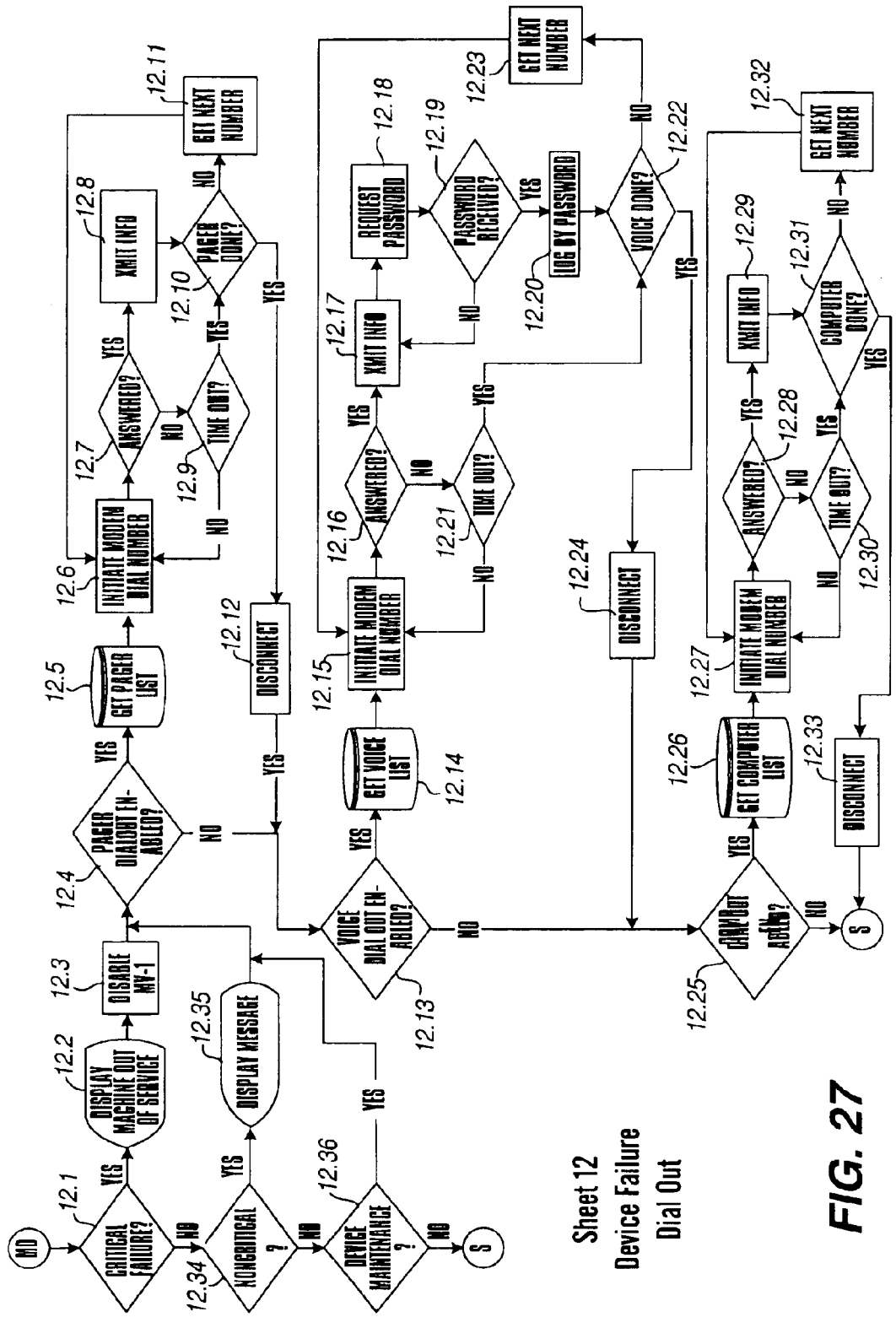
FIG. 27 is a flowchart of a software routine for providing device failure dial out functions according to an embodiment of the present invention.
Figure 28:
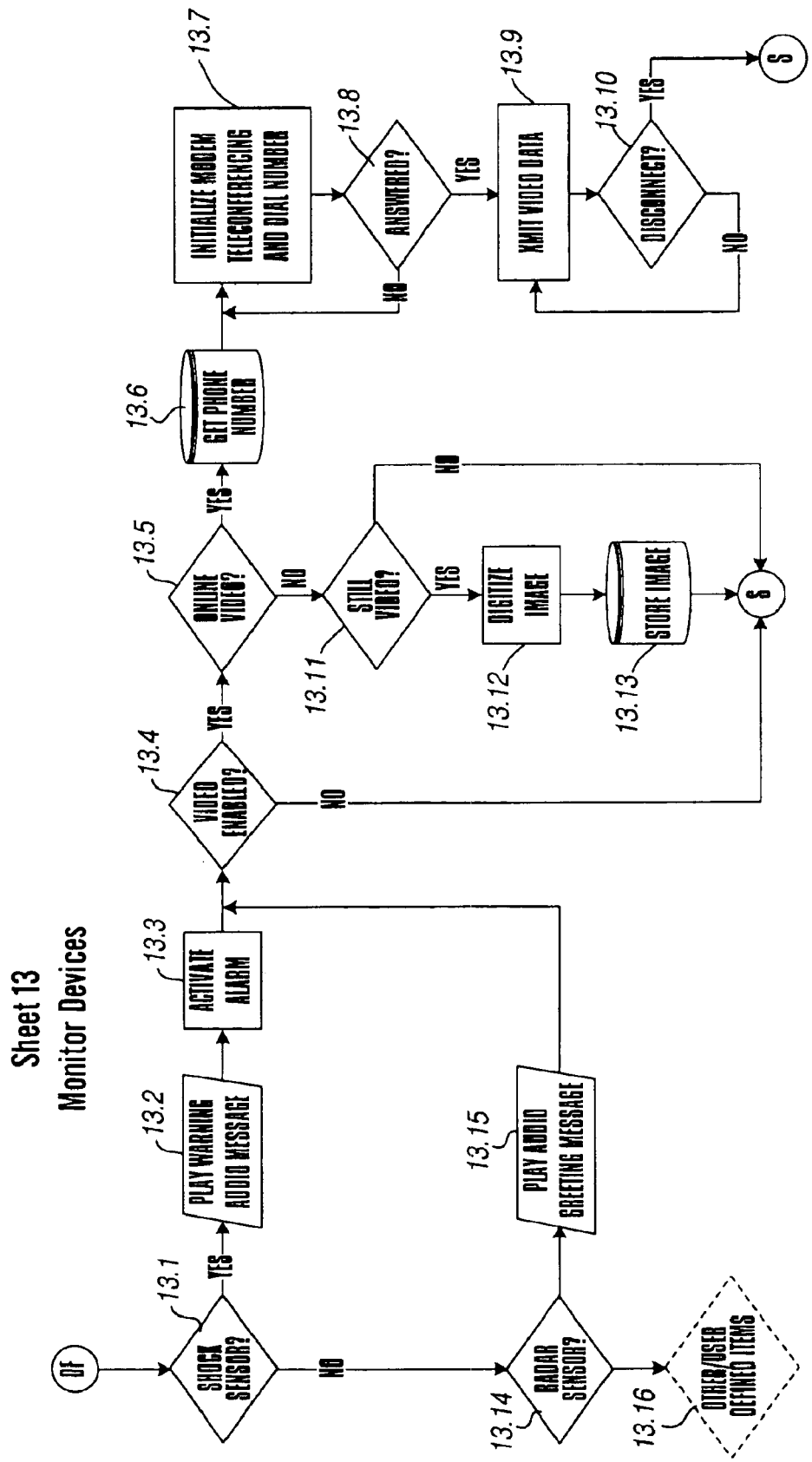
FIG. 28 is a flowchart of a software routine for monitoring device sensors according to an embodiment of the present invention.
Figure 29:
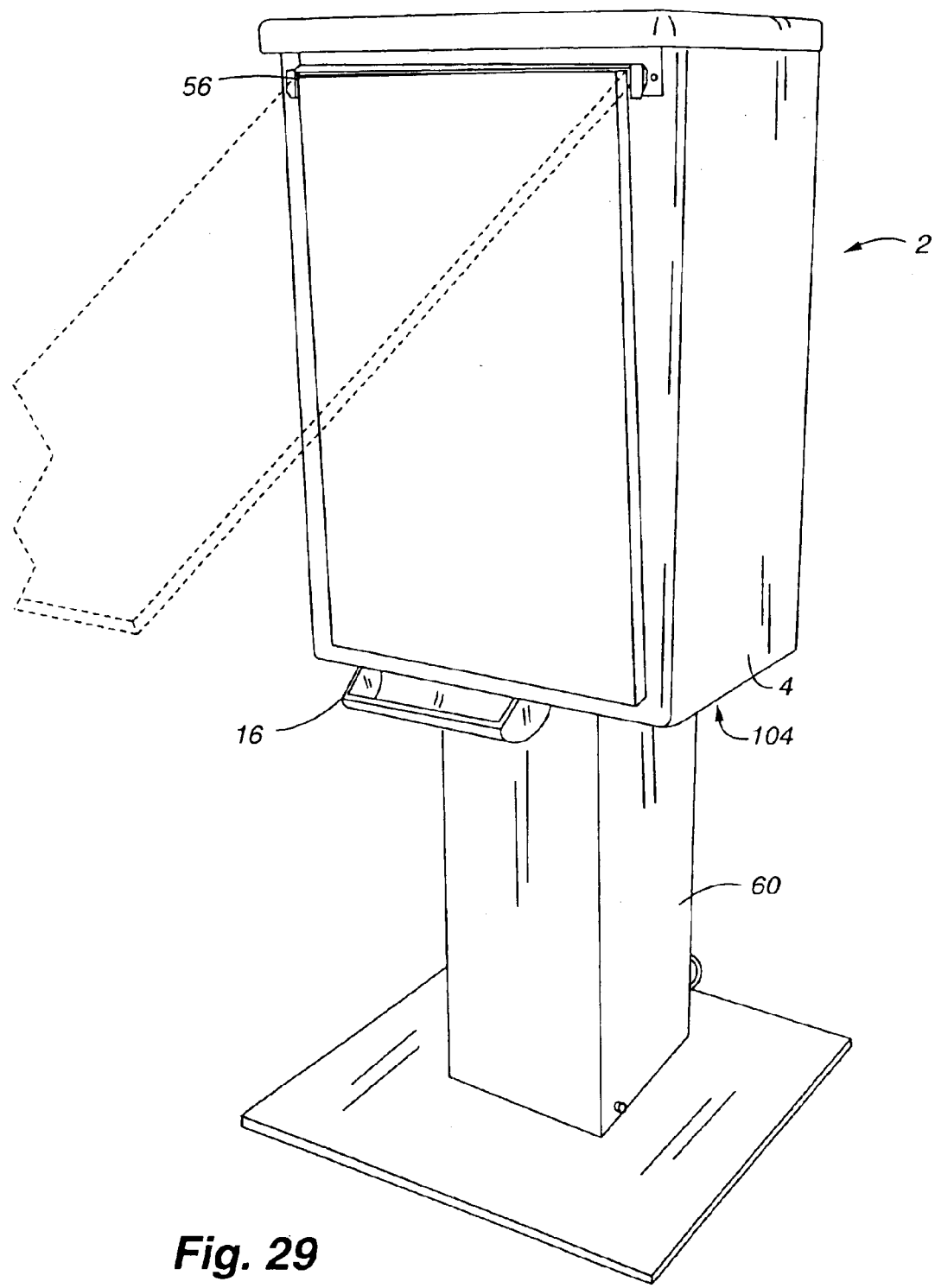
FIG. 29 is a front perspective view of an automated fee collection and ticket dispensing device showing the protective panel extended over the componentry positioned on the front of the device.

In an embodiment of the "pay and display" operational mode, the major steps of which are illustrated in FIG. 11, the user first selects the natural language that he or she wishes to use in completing the transaction (step 702). The machine 2 will then use the selected language in presenting textual or audible information to the user until the transaction is completed. The selected language may also be used on the user's printed receipt or ticket. Because the textual and audible information output from the machine 2 is stored in easily loaded and modified computer files, the machine 2 can be adapted to operate using any language. Accordingly, the machine 2 may be easily adapted for use in other countries, or in facilities commonly used by people speaking a variety of languages, such as an international airport. The capability to communicate to a user in any language is of course not limited to the "pay and display" mode, but can be offered by the machine 2 in any operating mode.

After selecting the desired language, the user then selects an amount of time that he or she wishes to leave his or her vehicle in the lot. This may be done by selecting one of a plurality of time options displayed on the touch screen 200, or by entering a desired amount of time using a key pad displayed on the touch screen 200 or both (step 704). The machine 2 calculates the amount due (step 706), and requests payment from the user (step 708). The user may then tender payment of the indicated amount (step 710). Payment of the applicable parking fee may be made in any of the ways described above with respect to the "pay on foot" mode. Upon receipt of proper payment, the machine 2 issues a ticket for display on the user's vehicle (step 712). The user may then take the ticket, park the vehicle, and leave the ticket on display, e.g. in the window of the vehicle (step 714).

Where the user has misjudged the amount of time the parking spot is desired, additional time can be purchased from the machine 2 in the form of an additional ticket (step 716). Alternatively, for example, if lower rates are offered to longer term parkers, the original ticket can be presented to the scanner of the machine 2, and a new ticket issued at a lower rate, or updated indicia can be presented on the original ticket. The precise selection of options presented to a user can be varied by the operator by setting provided software switches or by editing the operating program files.

If desired, refunds may also be offered to users who require a space in the parking lot for less time than they originally purchased (step 720). In this circumstance, the original ticket may be presented to the scanner 31 of the machine 2 (step 722) and a partial refund issued (step 724). Alternatively, a voucher good for parking at a later date may be issued, or credit may be added to a credit card account or fee card (step 724).

In an embodiment of the "pay by space" operational mode, the major steps of which are illustrated in FIG. 12, the machine 2 may direct the user to park in a particular space (step 802). In this instance, the issued ticket not only indicates a valid time and date, but also a valid space. In connection with such a system, the machine 2 may alternatively present the user with a plurality of spaces from which the user may make a selection (step 802). If desired, the various spaces may be assigned different rates by the operator depending on the desirability of the space. Accordingly, a space near the entryway of a large office building serviced by the lot may cost more than a space at the end of the lot, far from a popular destination. The price of spaces may be assigned according to blocks of spaces, or on an individual basis, or both. Additionally, the system may limit the amount of time available from certain spaces, to, for example, promote turnover in desirable spaces. The price of spaces or the time they are offered for may also be varied by the time of day or the day of the week. This great flexibility is due to the machine's 2 operation being coded in easily modified files. The fee is then calculated (step 806) and payment is requested (step 808). After the user pays (step 810) using any of the methods described in detail above that may be accommodated, a record of the transaction is made (step 812). This record of the transaction is preferably made in the form of a computer file written to the hard disk drive 502 and to any provided removable storage 506. Alternatively or in addition, a record of the transaction may be transmitted to an offsite computer 512 over a communications link 514. A ticket or receipt may then be issued to the user (step 814).

As yet another variation on the "pay by space" operational mode, the user may park in an available space, and then approach the machine 2 for payment. According to this variation, the user will generally be asked to enter the space number in which his or her vehicle is located (step 802). The user may also be asked to enter or select an amount of time the space will be used (step 804). The fee due may be based on the desirability of the space, the amount of time the space is desired, or both. After payment has been received, a ticket may be printed for display on the vehicle (step 814).

Although the above examples discuss the issuance of a display ticket, in which case enforcement of proper fee payment could be made by personnel visually ensuring that all vehicles in a lot have a proper ticket, other enforcement means are possible. For example, where a user selects or is issued a particular parking space, the machine 2 may associate that space with other details of the transaction, such as length of time purchased. Enforcement may then be conducted by outputting a printout from a printer 28 or 29 indicating those spaces for which proper payment has been made. That list may then be carried through the lot by enforcement personnel to ensure that no vehicles are parked in spots that have not been paid for. Alternatively, and particularly where the lot is relatively small, a readout of the spots that have been paid for may be presented on the touch screen display 200 itself, avoiding the use of materials otherwise required to prepare a hard copy of the report. In any event, full records regarding spaces purchased can be maintained on computer readable files. According to a preferred embodiment, such records will be written to a removable storage device 506, such as a floppy disk 8. Alternatively, or in addition, these files may be communicated to another computer 512 located outside of the machine 2 over a network, telephone line, or other communications link 514. The computer readable file thus generated allows personnel responsible for management of the machine 2 and parking lot to accurately audit receipts and usage of the lot.

Another aspect of the machine 2 is that it provides for the conservation of energy. Measures to conserve energy include a system sleep mode, which powers down the system until sensor detects the presence of a user or an inquiry from an offsite computer 512. In addition to conserving power, the sleep mode lengthens the life of internal components. Also, although the system may be powered by a common 115-volt AC power connection, it may alternatively be operated using solar power. In either of these configurations, a 12-volt battery backup 528 is supplied. Optionally, additional backup batteries may be installed to extend the time that the system may remain in operation if power from the AC connection or solar panel is not available. These measures at power conservation allow the system to draw only about one ampere of current when it is in sleep mode. In operation, the machine 2 typically draws a maximum of 6½ amperes. In cold weather, the maximum current draw may raise to about 30 amperes due to the use of an internal heater 534 or heaters. Of course, solar-powered units are advantageous where the machine 2 is to be installed in remote locations. Where power is supplied by a conventional AC connection, the system includes a line conditioner for complete protection of the internal electronic components from surges and spikes in the power supply.

In yet another operational mode that may be provided, the "park pass" mode, the major steps of which are illustrated in FIG. 13, the automated fee collection machine 2 of the present invention may be used to collect use fees for other than a parking lot. Thus, according to one embodiment of the present invention, an operational mode is provided in which the machine 2 can issue entrance passes for, e.g. a national park, permits for camping and other fee based activities, and other functions, such as providing information to a park visitor.

Particularly when the machine 2 is to be placed in a remote location, such as in a park, it is desirable to provide a "sleep" mode (step 902) to allow the machine 2 to conserve power. When a sleep mode has been entered, only essential functions of the machine 2 are operational. According to one embodiment, the radar proximity sensor 36 remains operational while the machine 2 is in the sleep mode. This allows the presence of a user to be detected (step 904) without requiring input from the user. Detection of a user (step 904) may also be accomplished by displaying a button on the touch screen 200 that can be pressed by the user to awaken (step 906) the machine 2. The detection of a user through the radar proximity sensor 36 or by eliciting input from a user may also be used to begin special machine 2 functions, such as warming-up the print heads of any provided thermal printers.

The machine 2 may present the user with a number of options (step 908) from which to choose. For example, a user may select (step 910) from the menu of available entrance passes or other options. Such passes may be for differing lengths of time or access, and may offer discounted rates for seniors or holders of related passes. The fee due is then calculated (step 912), and payment is requested (step 914). As described more fully above in the context of payment for parking fees, payment for the selected pass may be made by any of a number of methods (step 916). The pass may then be issued by a printer 28 or 29 to the user (step 918). Alternatively, and in particular where the pass is for a longer term (e.g. 30 days, 60 days, or one year) a preprinted pass may be issued from a dispenser 518. The preprinted pass may be issued as a sticker or decal for placement on the user's vehicle. Alternatively, additional indicia may be added by the printer 28 or 29 to an otherwise preprinted pass before issuance. This allows, for example, a 30 day pass otherwise preprinted on card stock or as a sticker or decal can include the date of issuance and the date of expiration, or for the addition of a bar code.

As another feature, a user of the park may, before paying for and receiving an entrance pass, choose to complete other transactions (step 920). For example, the user may additionally purchase a boating pass or a pass for some other activity not included in the general entrance fee. Additionally, the user may, for example, purchase a campsite for one or more nights. Thus, in a procedure similar to the one described above with respect to particular parking spaces, the machine 2 may present the user with a choice of one or more available camping spots. The display of camping spots available may be modified based on factors entered by the user, such as the dates that the campsite is desired, and the particular location of the campsite. Therefore, if a user indicated a desire to purchase a campsite for two particular nights, only campsites available on both those nights would be offered to the user for selection. Such additional transactions may continue until the user indicates that completion of the entire transaction is desired. At this point, the machine 2 will request payment for the entire amount due. After proper payment has been received, receipts, stickers, decals, voucher, or any other appropriate indicia of payment can be issued.

As mentioned above, discounted rates may be offered to certain users, for example for senior citizens. In order to verify the age of the user, the machine 2 may require the user to enter his or her driver's license into the magnetic strip card reader. The card reader may then determine whether the user is indeed of the age required to qualify for the discount.

Another situation in which it may desirable to offer an altered rate schedule is where a user has purchased an entrance fee to a companion park. In such a situation, the user may be offered a discount for access or the purchase of other types of passes at an additional park. In this case, the machine 2 may require the user to enter a pass from the other park into the bar code scanner 31. The bar code can then be scanned and a discount offered.

Because of the flexible user interface provided by the device, the machine 2 is easily configurable to allow for seasonal or administrative changes in the permits that are available, or to be reconfigured for changes in fee schedules.

When the machine 2 is otherwise in sleep mode, the audio and visual output capabilities of the machine 2 may be used to present advertising or other information. The presentation of such information may be interrupted when a user pushes a display button. The audio and visual output capabilities may also be used to present information to a user regarding available transactions. For example, an embodiment of the machine 2 having a "theater" operational mode adapted for placement in a mall or theater may present information regarding upcoming film showings, indicating time and cost, and may even offer clips or "trailers" of selected films. A user could then purchase tickets to the desired show. Upon issuing the purchased tickets, the machine 2 could then present coupons, either preprinted or printed upon issuance, to the user for refreshments at the theater or for goods or services available from nearby establishments.

Where the machine 2 is used in a remote location, it may be desirable to enable operation without requiring access to the power grid. Accordingly, the machine 2 may be provided with a plurality of batteries, in addition to the backup batteries 528, to provide the primary power source for the machine 2. A consistent and adequate supply of power to the machine 2 may be ensured by periodically swapping the machine's 2 batteries for batteries that have been charged at a central location. Alternatively or in addition, the machine 2 may be provided with solar panels to operate the machine 2 and/or recharge the machine's 2 batteries. Generally, even where the machine 2 is connected to an AC power supply, batteries 528 will be provided to ensure proper operation in the event of a blackout or other interruption of power. Where batteries are the primary power source for the machine 2, an enlarged pedestal in which to house them may be provided.

Regardless of the operating mode or modes, the machine 2 of the present invention may be provided with a variety of sensors to deter vandalism of or theft of the machine 2. For example, a shock sensor 516 may be provided to detect parties attempting to knock over or break into the machine 2. Upon the detection of a shock, the machine 2 may issue a verbal warning. If the shocks continue to be detected, the verbal warnings may be progressively more stern. In addition, activation of the shock sensor 516 may be used to selectively trigger an alarm, or contact security personnel over a communications link.

An offsite computer 512 or security personnel 510 may be notified when attempts at vandalizing the machine 2 are made. Thus, when attempts are made to insert foreign objects into the device, or the device is subjected to battering, a signal is sent to the offsite computer 512. In addition, the machine 2 may be programmed to issue a voice warning, operate a siren, operate a video or still camera to capture the image of the perpetrator, or notify authorities or security personnel 510 via a modem. The same communication lines 514 that are used to transmit the notification of the vandalism attempt from the modem may also be used to allow security personnel 510 to issue audible warnings to the perpetrators, and to transmit an audio signal from the machine 2 to the security personnel 510.

As an additional deterrent to vandalism or theft, the machine 2 may be provided with a camera 520. In a preferred embodiment, the camera 520 is activated upon the detection of a shock by the shock sensor 516. The camera 520 may be used to selectively take still or full motion pictures of the perpetrators. The camera 520 may also be used in combination with verbal warnings, informing the perpetrators that their pictures are being taken. Alarm functions, such as sirens at the device and notification of security personnel 510 via modem may also be provided. The alarms and video recording devices may be triggered by the activation of the shock sensors 516, the unauthorized opening of the door 12 or removal of a component, or the presence of foreign objects in a port of the machine 2.

The machine 2 may also provide certain emergency capabilities. For example, a user or other person who witnesses or is the victim of a crime, may, through the machine 2, contact police or security personnel. Communication with such personnel may be provided over a network or telephone link 514. Using the link 514, the person signaling the emergency may talk to the contacted personnel through the provided microphone 42. Replies from the security personnel may be output through the device's provided speaker 522. Because the machine 2 provides a microphone 42 to allow the user to speak to personnel at the receiving end of the call, the 911 system may be accessed.

The machine 2 of the present invention may also be provided with means for ensuring that favorable atmospheric conditions are maintained in the machine's 2 interior. Thus, a temperature sensor 528 may be provided in the interior of the machine 2. Where the temperature inside the machine 2 exceeds a predetermined amount, a cooling fan 532 inside the protective shell or enclosure 4 may be activated to draw air through the interior of the machine 2, thereby lowering its temperature. When a predetermined low temperature is detected, a heater 534 may be activated to maintain a desired minimum temperature inside the machine 2. The temperature sensor 528 may also be used to activate a defrosting fan 530 to ensure that the output from the LCD is visible through the touch screen 200 and Lexan cover 46. In a preferred embodiment, the cooling fan 532 is set to activate at 80° F., and the heater 534 and/or defroster 530 is set to turn on at 20° F. and off at 75° F. However, any of these temperature settings may be easily changed by changing the appropriate setting in the controlling software.

Through the provided communication features, the machine 2 can notify an offsite computer 512 of various conditions. For example, the level of paper or other stock used to print receipts, passes, and/or decals, is monitored. The device can thus provide notification when the paper has reached a certain level. Similarly, the machine 2 monitors the level of coins in the coin hopper 22. The machine 2 can also provide notification of activity at the machine 2 by informing the host computer of the number of receipts or passes that have been dispensed, the amount of change that has been received or refunded, or the amount of bills that have been tendered or rejected.

According to one embodiment of the present invention, machine maintenance may at least partially be completed from a remote computer system. Operations suitable for remote maintenance include the collection of transaction reports and the modification of system functions and settings. For example, maintenance personnel at an offsite computer 512 may contact the machine 2 over the communications link 514. After establishing communication with the programmable computer 6 of the machine 2, files containing transaction records can be downloaded for analysis and storage at a central location. Additionally, settings such as the fees charged for particular spaces or the spaces available can be altered from the offsite computer 512. Additionally, new operating files or changes to the configuration of installed operating files can be loaded from the offsite computer 512. The communications link 514 may also be used by the machine 2 to contact the offsite computer 512 when maintenance is or soon will be required.

Maintenance can also be performed at the machine 2 itself. Servicing and programming of the machine 2 may be effected by the use of smart cards or PIN numbers carried by service personnel. Each such access method may provide for varying levels of access to machine functions. The configurable programming capabilities include the ability to change rates, available sites or spaces, or user interface messaging. Further, changes to the configuration of the machine 2 may be made either on site or remotely. The machine 2 also provides for flash mode programming, which allows the configuration of the machine 2 to be changed instantly. Alternatively, changes may be entered via on-site or remote keyboard or menu commands.

According to one embodiment of the present invention, differing levels of maintenance access are provided. For example, at a first level, maintenance personnel may be granted access to on-screen or printed lists of recent transactions or reports. At this first level, access to records concerning individual spaces may also be granted, for example to allow a particular parking spot to be kept empty. However, access to the interior of the machine by an electronic latch may be denied at this level.

At a second level of access, maintenance personnel may also be allowed to perform maintenance on the interior of the machine. Thus, this second level of access grants maintenance personnel access to the machine's 2 interior, whereas in the above-described level of access, no such privilege was granted. Accordingly, only more trusted personnel should be granted higher levels of access. Personnel with this second level of access can also remove and replace storage media such as floppy disks and magnetic tapes from the interior of the machine 2, or to download data to removable storage 506 media or to a second computer converted to the communications link 514 or to a port provided on the machine 2.

At another level of access, machine diagnostics functions may be performed, as well as operations involving the coin 54 and bill 18 acceptors. Personnel granted this level of access may also perform system backups and load and remove operating files from the machine 2. Accordingly, only the most trusted personnel should be given this level of access.

Of course, the various maintenance procedures described above can be selectively granted to any or all access levels. The precise procedures that can be performed under any of the access levels can be selected by the operator with complete flexibility. According to one embodiment, the differing levels of access are controlled by information contained on an access card held by maintenance personnel. Thus, insertion of a level 1 access card, according to the example above, will grant the holder access to a printout or display of recent transactions, and a menu to edit the availability of parking spaces, but will not open the door 12. Higher levels of access may, in addition to the options allowed by level 1, enable the maintenance personnel to open the door 12 and gain access to the interior of the protective enclosure 4.

One additional aspect of the invention is the comprehensive accounting and reporting features it provides. Thus, all cash denominations are tracked as to usage and amount. Further, full auditing for credit, debit, and ATM card transactions is provided. Thus, card information, including card holder name, amount, date, and a detailed report of fees paid for during the transaction, can be displayed or printed. The general ledger style fund allocation feature allows funds to be dispersed to the appropriate collection sources. Also, ATM shift report forms are produced automatically. Further, because of the flexible nature of the accounting features, transactions may be grouped in a wide variety of ways, such as by fee type, entity to which particular collections are due, and usage of services or facilities administered through the particular device.

According to an embodiment of the present invention, an editor is provided to allow the operator to quickly and easily change the configuration files of the machine 2. In general, the editor may be run on a offsite computer 512, and is used to modify various software settings contained in the machine's 2 operating program configuration files. Thus, for example, the operator may change the color or shape of user input buttons displayed on the color touch screen display 200, or even the selections available to the user. The editor program is user friendly, and can be used without removing the machine 2 from service. Additionally, the machine's 2 operating program can be run on a personal computer that is not necessarily associated with the machine 2 in a simulation mode to verify its proper operation.

Flow sheets illustrating the detailed operation of the controlling program and example operating modes are shown in FIGS. 14–28. These flow sheets illustrate the various steps taken by the program of the machine, although by utilizing the personal computer, an almost endless number of operating modes, programs and confirmations can be adopted, depending on the particular application.

In a further aspect of the machine 2, security against attempts at theft perpetrated by personnel responsible for operating and servicing the device is also provided. Such security measures include programmable levels of personnel access to software functions or physical areas of the device. Also, the extensive accounting features provided make the theft of cash or coin from the device by personnel given access to it extremely difficult.

In accordance with the present invention, an automated fee collection and ticket dispensing machine is provided. The invention in its broader aspects relates to a machine for automatically collecting fees and dispensing receipts to users. More particularly, the invention relates to a machine for collecting fees using one of a plurality of supplied operating modes selected by the user or operator of the machine.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. An isolated, stand alone, automated fee collection and ticket dispensing device adapted for operating in a plurality of operational modes, comprising:
   a power supply;
   a durable protective enclosure having locking means for securing an access door;
   a fee collection means for collecting a payment from a user and providing change as necessary;
   a first output device adapted to modify a first ticket stored in said dispensing device;
   a second output device adapted to modify a second ticket stored in said dispensing device;
   a dispensing chute with a first aperture to receive the first ticket outputted from said first output device, and a second aperture to receive the second ticket outputted from said second output device, said dispensing chute further comprising a dispensing tray extending outside of said protective enclosure which allows the first ticket and the second ticket to be discharged from the dispensing chute;
   an air flow dispensing means in operable communication with said dispensing chute and a power supply, wherein upon receiving a signal, said air flow dispensing means provides air flow within said dispensing chute, wherein the first ticket and the second ticket are dispensed from said dispensing chute; and
   a computer positioned within said durable protective enclosure and operably interconnected to at least said fee collection means, said power supply and said first output device and said second output device.

2. The automated fee collection device of claim 1, further comprising a third output device adapted to modify a third ticket stored in said device, wherein said dispensing chute further comprises a third aperture to receive the third ticket outputted from said third output device.

3. The automated fee collection device of claim 1, wherein at least one of said first output device and said second output device is a thermal transfer printer.

4. The automated fee collection device of claim 1, wherein at least one of said first output device and said second output device is capable of applying at least one colored material to the first ticket and the second ticket.

5. The automated fee collection device of claim 1, wherein at least one of said first output device and said second output device is capable of cutting at least one of the first ticket and the second ticket into a predetermined shape.

6. The automated fee collection device of claim 1, wherein the first ticket and the second ticket may be dispensed when said access door is opened.

7. The automated fee collection device of claim 1, further comprising at least one environmental control means positioned within said enclosure, wherein at least one of a temperature, a relative humidity and a power source may be controlled automatically.

8. The automated fee collection and ticket dispensing device of claim 1, wherein said computer comprises a programmable personal computer.

9. The automated fee collection device of claim 1, wherein at least one of the first ticket and the second ticket comprises at least one of a decal, a sticker, a parking pass, and a payment receipt.

10. A method for dispensing items within an automated fee collection and ticket dispensing device, comprising the steps of:
    displaying at least first information on a visual display means, said first information comprising instructions for using said dispensing device for said item;
    providing a user input means that allows the user to provide input information;
    detecting said input information from said user input means;
    providing a means to accept payment;
    providing a plurality of output means that prints predetermined information on at least one of said item;
    providing a chute with a plurality of apertures that receives at least one of said item after it has been altered by at least one of said plurality of output means;
    providing a blower which is in operable communication with said chute and which provides a flow of air through said chute, wherein said at least one of said item is expelled from said chute; and
    dispensing said item through said chute.

11. The method of claim 10, further comprising the step of signaling said blower when to turn on and when to turn off.

12. The method of claim 10, further providing a programmable computer in operable communication with at least said user input means, said visual display means and said means to accept payment, wherein said dispensing device is a stand alone machine capable of operation in a remote location.

13. The method of claim 10, wherein said plurality of output means is a thermal transfer printer.

14. The method of claim 10, wherein said plurality of output means is capable of cutting said item into a predetermined shape.

15. The method of claim 10, wherein said user input means comprises a touch sensitive screen.

16. The method of claim 10, wherein said predetermined information is a message, a sticker, a parking space number, a bar code, a decal, or a black ink.

17. The method of claim 10, further comprising the steps of providing an access door for said device that has a first closed position and a second open position, said device being capable of operation when said door is in said first position and said second position.

18. An automated fee collection and dispensing device of claim 10, wherein the item comprises a decal, a sticker, a ticket, a message and a receipt.

19. The automated fee collection device of claim 10, where said means to accept payment comprises at lest one receptacle for receiving legal tender, coins and a credit card.

20. An automated fee collection and dispensing device, comprising:

an isolated, stand alone, automated fee collection and ticket and/or decal dispensing device adapted for operating in a plurality of operational modes, comprising:

a durable protective enclosure having locking means for securing an access door;

a computer positioned within said protective enclosure and operatively interconnected to monitor and control at least one of a plurality of operating conditions associated with said isolated, stand alone, automated fee collection device;

computer programming stored in said computer, wherein said programming provides at least two operational modes;

a visual display in operable communication with said computer and operably positioned on said durable protective enclosure;

a fee collection means for collecting a payment from a user and providing change as necessary;

a first output device adapted to modify a ticket and/or decal stored in said dispensing device;

a second output device adapted to modify the ticket and/or decal stored in said device;

a dispensing chute with a first aperture to receive the first ticket and/or decal outputted from said first output device, and a second aperture to receive the second ticket and/or decal outputted from said second output device, said dispensing chute further comprising a dispensing tray extending outside of said protective enclosure which allows the first ticket and/or decal and the second ticket and/or decal to be discharged from the dispensing chute; and means for supplying power to said ticket and/or decal dispensing device.

21. The dispensing device of claim 20, further comprising an air blower in operable communication with said dispensing chute and a power supply, wherein upon receiving a signal said air blower directs a volume of air into said dispensing chute to facilitate the travel of the ticket and/or decal to said dispensing tray.

* * * * *